US012592215B2

(12) United States Patent
Brancalion et al.

(10) Patent No.: US 12,592,215 B2
(45) Date of Patent: Mar. 31, 2026

(54) WIRELESS SWITCHING SYSTEM FOR MUSICAL INSTRUMENTS AND RELATED METHODS

(71) Applicant: Carter Duncan Corp, Goleta, CA (US)

(72) Inventors: Guido Brancalion, Cureggio (IT); Kevin Beller, Solvang, CA (US)

(73) Assignee: Carter Duncan Corp, Goleta, CA (US)

( * ) Notice: Subject to any disclaimer, the term of this patent is extended or adjusted under 35 U.S.C. 154(b) by 1028 days.

(21) Appl. No.: 17/529,096

(22) Filed: Nov. 17, 2021

(65) Prior Publication Data

US 2022/0157287 A1 May 19, 2022

Related U.S. Application Data

(60) Provisional application No. 63/115,024, filed on Nov. 17, 2020.

(51) Int. Cl.
*G10H 3/18* (2006.01)
*G10H 1/00* (2006.01)

(52) U.S. Cl.
CPC ........... *G10H 3/181* (2013.01); *G10H 1/0008* (2013.01); *G10H 2220/091* (2013.01); *G10H 2220/461* (2013.01)

(58) Field of Classification Search
CPC ................. G10H 3/181; G10H 1/0008; G10H 2220/091; G10H 2220/461
USPC ............................................................ 84/742
See application file for complete search history.

(56) References Cited

U.S. PATENT DOCUMENTS

| | | | |
|---|---|---|---|
| 5,576,507 | A | 11/1996 | LaMarra |
| 5,834,671 | A | 11/1998 | Phoenix |
| 7,115,810 | B2 | 10/2006 | Ambrosino |
| 7,276,657 | B2 | 10/2007 | Bro |
| 7,601,908 | B2 | 10/2009 | Ambrosino |
| 7,982,124 | B1 | 7/2011 | Landis |
| 8,039,723 | B2 | 10/2011 | Lazovic |
| 8,455,750 | B1 | 6/2013 | Severson |
| 8,796,531 | B2 | 8/2014 | Ambrosino |
| 8,907,198 | B2 | 12/2014 | Juszkiewicz |
| 9,082,383 | B2 | 7/2015 | Haddad |
| 9,196,235 | B2 | 11/2015 | Ball |
| 9,263,015 | B2 | 2/2016 | Juszkiewicz |
| 9,355,630 | B2 | 5/2016 | Fishman |
| 9,620,096 | B2 | 4/2017 | Ambrosino |
| 9,640,162 | B2 | 5/2017 | Ball |
| 9,679,550 | B2 | 6/2017 | Fishman |

(Continued)

FOREIGN PATENT DOCUMENTS

| | | |
|---|---|---|
| WO | 2019064035 | 4/2019 |
| WO | 2019155221 | 8/2019 |
| WO | 2020053107 | 3/2020 |

OTHER PUBLICATIONS

Extended European Search Report 21895525.0, dated Sep. 30, 2024.

(Continued)

*Primary Examiner* — Jianchun Qin
(74) *Attorney, Agent, or Firm* — Jonathan D. Spangler; Jay B. Bell

(57) ABSTRACT

Wirelessly programmed and controlled switching system for use with stringed musical instruments (e.g., guitars) to enable a user to seamlessly change pickup coil settings without having to adjust the physical connections between the switch and the pickups.

20 Claims, 19 Drawing Sheets

(56) References Cited

U.S. PATENT DOCUMENTS

| | | | | |
|---|---|---|---|---|
| 9,734,811 | B2 | 8/2017 | Haddad | |
| 9,799,316 | B1 | 10/2017 | Owens | |
| 10,002,600 | B1 | 6/2018 | Owens | |
| 10,115,379 | B1 | 10/2018 | Juszkiewicz | |
| 10,115,381 | B2 | 10/2018 | Zanetti | |
| 10,217,450 | B2 | 2/2019 | Baker | |
| 10,403,252 | B2 | 9/2019 | Chapman | |
| 10,418,009 | B2 | 9/2019 | Juszkiewicz | |
| 2005/0211081 | A1 | 9/2005 | Bro | |
| 2006/0011051 | A1 | 1/2006 | Ambrosino | |
| 2007/0227344 | A1 | 10/2007 | Ryle et al. | |
| 2012/0024129 | A1 | 2/2012 | Ball | |
| 2012/0036983 | A1* | 2/2012 | Ambrosino | G10H 3/183 84/731 |
| 2013/0058507 | A1 | 3/2013 | Arknaes-Pedersen | |
| 2014/0037105 | A1 | 2/2014 | Heineman | |
| 2014/0150630 | A1* | 6/2014 | Juszkiewicz | G10H 1/44 84/626 |
| 2014/0298977 | A1 | 10/2014 | Ambrosino | |
| 2019/0066644 | A1 | 2/2019 | Zanetti | |

OTHER PUBLICATIONS

PCT International Search Report and Written Opinion of the International Searching Authority, PCT/US2021/059758, Mailed Feb. 7, 2022.

* cited by examiner

WIRELESS SWITCHING SYSTEM FOR MUSICAL INSTRUMENTS AND RELATED METHODS

CROSS-REFERENCES TO RELATED APPLICATIONS

The present application claims priority under 35 USC 119(e) to U.S. Provisional Patent Application Ser. No. 63/115,024, filed on Nov. 17, 2020 and entitled "WIRELESS SWITCHING SYSTEM FOR MUSICAL INSTRUMENTS AND RELATED METHODS," the entire contents of which are hereby incorporated by reference into this disclosure as if set forth fully herein.

FIELD

The present disclosure relates generally to musical instruments, and more particularly to switching systems for musical instrument pickups.

BACKGROUND

A pickup is a transducer that captures or senses mechanical vibrations produced by musical instruments, particularly stringed instruments such as the electric guitar, and converts these to an electrical signal that is amplified using an instrument amplifier to produce musical sounds through a loudspeaker in a speaker enclosure. The signal from a pickup can also be recorded directly. Most electric guitars and electric basses use magnetic pickups. Acoustic guitars, upright basses and fiddles often use a piezoelectric pickup.

A typical magnetic pickup is a transducer (specifically a variable reluctance sensor) that consists of one or more permanent magnets (usually alnico or ferrite) wrapped with a coil of several thousand turns of fine enameled copper wire. The magnet creates a magnetic field that is focused by the pickup's pole piece or pieces. The permanent magnet in the pickup magnetizes the guitar string above it, creating a magnetic field around the string that is in alignment with the magnetic field of the pickup magnet. When the string is plucked, the magnetic field around it moves up and down with the string. This moving magnetic field induces a current in the coil of the pickup.

The pickup is connected with a patch cable to an amplifier, which amplifies the signal to a sufficient magnitude of power to drive a loudspeaker (which might require tens of volts). A pickup can also be connected to recording equipment via a patch cable. The pickup is most often mounted on the body of the instrument, but can be attached to the bridge, neck and/or pickguard.

Single-coil pickups act like a directional antenna and are prone to pick up mains hum—nuisance alternating current electromagnetic interference from electrical power cables, power transformers, fluorescent light ballasts, video monitors or televisions—along with the musical signal. Mains hum consists of a fundamental signal at a nominal 50 or 60 Hz, depending on local current frequency, and usually some harmonic content.

Mains hum can be overcome by using a humbucking pickup. A humbucking pickup is composed of two coils, with each coil wound reverse to the other. Each set of magnetic poles is also opposite in polarity. Since ambient hum from electrical devices reaches the coils as common-mode noise, it induces an equal voltage in each coil, but 180 degrees out of phase between the two voltages. These effectively cancel each other, while the signal from the guitar string is doubled.

When wired in series, as is most common, the overall inductance of the pickup is increased, which lowers its resonance frequency and attenuates the higher frequencies, giving a less trebly tone (i.e., "fatter") than either of the two component single-coil pickups would give alone. An alternative wiring places the coils in buck parallel, which has a more neutral effect on resonant frequency and reduces the output while extending high frequency response.

A side-by-side humbucking pickup senses a wider section of each string than a single-coil pickup. By picking up a larger portion of the vibrating string, the higher frequency harmonics are cancelled in the signal produced by the pickup, resulting in a "fatter" tone. Humbucking pickups in the narrow form factor of a single coil, designed to replace single-coil pickups, have the narrower aperture resembling that of a single coil pickup. This results in less cancellation of harmonics and a brighter sound, more like a single coil pickup.

Most electric guitars have two or three magnetic pickups. A combination of pickups is called a pickup configuration, usually notated by writing out the pickup types in order from bridge pickup through mid pickup(s) to neck pickup, using "S" for single-coil and "H" for humbucker. Typically the bridge pickup is known as the lead pickup, and the neck pickup is known as the rhythm pickup.

Every pickup coil has two basic properties that affect how they will sound when they are combined with others. These properties are called phase and magnetic polarity. Phase is the direction current travels through the pickup, and polarity is the orientation of the magnetic field. With both properties, there are only two options. Phase can either be "top coming" or "top going", determined by winding direction of the coil, or "counter-clockwise" or "clockwise", indicating the direction of rotation of the spindle of the winding machine. Magnetic polarity can either be "south" or "north."

A typical application of these principles is with single coil pickups. One property of single coils is that depending on their phase and polarity, it may be possible for them to be hum cancelling when combined. The key to a strong, full tone with hum cancellation is to combine single coil pickups that have opposite phase (or "wind") and opposite polarity with respect to one another. If one pickup is north polarity, top coming, the other must be south polarity, top going.

Humbuckers all operate on this principle. The two coils have opposite wind and opposite polarity. When combined in series mode, it produces a fat, meaty tone and no hum. Splitting a humbucker will, of course, bring back the hum, but give a brighter, cleaner sound with more high frequency content. Combining the two coils in parallel mode maintains hum-cancellation and produces a brighter tone than series mode, but with less output and less brightness than split mode.

When single coil pickups are mismatched, either hum or phase cancellation occurs. Phase cancellation occurs when two pickups interfere with each other's frequency responses to produce a "thin" or "hollow" sound. When this happens, the pickups are said to be "out of phase". While this is something that most performers might try to avoid, others might like the unique sound in certain situations, and some may use an out-of-phase tone by choice. In some situations, performers may want to switch between an in phase tone and an out of phase tone during a performance.

For two single coil pickups to be in phase, both the magnet polarity and the wind direction must either be identical, or both parameters must be opposite. In other words, two pickups with the same wind direction and magnetic polarity will be in phase, and so will two pickups that have opposite magnetic polarities and wind directions with respect to one another. If the two pickups have the same wind directions but different magnetic polarities, or the same magnetic polarities but different wind directions, they will be out of phase with one another.

The most common reason for two single coils to be out of phase is that one of them is wired backwards. The lead that was supposed to be connected to ground is connected to the output, and vise versa. If phase cancellation occurs when combining two single coils, the easiest cure is to swap the lead wires on one of them.

For two coils to be in phase and hum cancelling, one of them (only) will need to be reverse wind, reverse polarity (or "RWRP"). However, one problem is that different manufacturers may have different phase and polarity standards, making them a challenge to mix and match. However, if one knows in advance (or figures out upon installation), the problem can be overcome by rewiring the pickups.

As previously mentioned, many if not most instruments will use multiple pickups to capture sound. These pickups are hard wired to a toggle switch, the configuration of which determines which pickup or combination of pickups are used to transfer the string vibrations into an electrical signal. Each pickup is wired to the toggle switch with each pickup coil having a specific desired setting (e.g., in phase, or out of phase). In traditional electric guitars, for example, the audio signal coming from pickups has historically been controlled using mechanical switches that must be manually activated or operated to change the tone of the pickups. Adjustability between in phase and out of phase tones is highly desirable because it can produce many different tones, which increases the versatility of the instrument. Wiring a pickup requires skill and, even when wired correctly, results in fixed coil settings that require a change to the wiring to be modified. This process can be cumbersome and is not easily modified even with the right tools and knowledge. Thus, a need exists for a switch system that allows players to change their coil settings quickly and easily, enables many different tone combinations, and works seamlessly with pickups from different manufacturers.

SUMMARY

Disclosed herein are wireless switching systems for use with stringed musical instruments (e.g., guitars) to enable a user to seamlessly change pickup coil settings without having to adjust the wiring between the switch and the pickups. In one example aspect, a system includes a musical instrument having one or more pickups attached thereto, a switch device or mechanism mounted on the musical instrument and in electronic communication with the one or more pickups, a computing device configured for wireless communication with the switch, and a switch management software application program (or "app") stored on and executable by the computing device, in which a user is able to use the switch management app to remotely change the pickup coil settings of the user's instrument without having to rewire the switch device.

In some embodiments, the switching system of the present disclosure is an analog signal switch device and conditioner that can be controlled and programmed remotely, using radio waves, in communication with a software app on a computing device such as a smart phone, smart watch, tablet computer, desktop computer, and/or a laptop computer. The switching system of the present disclosure reduces or removes the need of skill in that pickups of any kind are directly connected to the switch in a standard way, and the switching system manages the wiring, signal conditioning, and all the needed connections to enable easy changing of the coil settings.

The switch device can be remotely connected to a smart phone or any other suitable computing device with wireless communication capability, offering an immediate preview of the sound differences between various pickup coil settings. Once the desired coil setting configuration is saved, the switching system can work in a standalone mode, simulating a normal mechanically operated guitar switch. The use of radio waves to exchange data removes the need to use any kind of cable or to open the instrument to program or rewire the switch device, and enables remote programming of the device in real time.

Additionally, the switching system of the present disclosure may accept inbound data to control the instrument signal path, may be used to collect the data coming from the instrument (lever position, potentiometer position, accelerometer, buttons, etc.), and may also be used to control other wireless-enabled peripheral devices.

Among other things, the switching system of the present disclosure boasts the following useful features.

In some embodiments, the data transfer and data exchange are wirelessly supported by radio waves. Controlling the analog signal path wirelessly enables easy access to the switch device and/or mechanism, with no need to remove instrument covers, plug in connector, or use special adapter to change the coil settings. Moreover, the use of radio standards such as WiFi, Bluetooth, and Bluetooth Low Energy (BLE) enable the use of the switching system with a wide number of common computing devices, such as smart phones, tablets, laptops, etc. to program and control the switch device remotely. Wireless control of the switch device enables it to be programmed in real time on a stage or in any situation where using a cable is impractical. Using radio waves can enable the transfer of the MIDI (Musical Instrument Digital Interface) protocol over the air, making it easy to connect the instrument to a sequencer or control peripheral devices from the musical instrument itself. This may be particularly useful during a live performance to control (and/or be controlled) without returning in a predefined place.

In some embodiments, the switching system of the present disclosure includes a simple user interface (UI) including touch screen interface. The UI converts complex wiring parameters in simple colors and is designed to be easy.

In some embodiments, the switching system of the present disclosure may use a proprietary serial communication protocol with a dynamic byte length and a closed loop check to ensure data consistency.

In some embodiments, the switching system of the present disclosure uses advanced power handling techniques to reduce the power consumption. Power is a necessary and important component of a wireless switching system. Traditionally, the existing switching systems are passive arrays of contacts mechanically actuated and require no power. The switching system of the present disclosure includes firmware designed to keep the processor always sleeping, using low level programming approach. To achieve this result, a wakeup protocol is executed before the operating system boots up, and then the CPU is forced back to sleep when the user is finished.

In some embodiments, the switching system of the present disclosure implements a true analog signal path without bypass capacitor or bias resistor in the signal path to ensure a wide frequency response and preserve the signal phase. This removes even unwanted capacitive loads.

In some embodiments, the switching system of the present disclosure may capture, record, and/or otherwise use lever position information (e.g. for electric guitars), analog audio streams that may be present on the instrument, and/or information of other sensors that may be present on the instrument or on the switch device itself (e.g., potentiometers, accelerometers, position sensors, buttons, etc.), and transmit the captured, recorded, or otherwise used data to the user's computing device or other computing systems, for example to control other peripheral wireless-enabled devices using a MIDI protocol or any other serial protocol.

As additional description to the embodiments described below, the present disclosure describes the following embodiments.

Embodiment 1 is a wireless switching system for stringed musical instruments having at least one pickup, comprising: (1) a multi-position switch device having: (a) a selector movable between a plurality of selectable positions, each position establishing a portion of a signal pathway from at least one pickup input to an output, the selector operable by a user to effect a change in the electrical signal pathway between the at least one pickup input and the output; (b) a multiplexer configured to provide multiple configurable signal pathways between the at least one pickup input and the output; (c) a control unit having a processor in data communication with a memory unit and a wireless communications unit, the control unit configured to determine the active signal pathway through the multiplexer; and (2) computer-readable media embodied in a nontransitory storage medium comprising instructions that, when executed by one or more processors, cause a computer system to: (a) receive pickup configuration data that is related to the wiring configuration that determines sound output of at least one pickup mounted on the user's stringed musical instrument, and that is input by a user, the pickup configuration data comprising: (i) pickup location on the user's stringed instrument for a given selector position selected by the user; and (ii) wiring configuration for a given pickup at a given selector position selected by the user; (b) provide, on a display device, an interactive presentation of the pickup location and selected wiring configurations for each pickup at each selector position; and (c) wirelessly communicate the user-selected wiring configurations for each selector position of the multi-position switch device to the control unit of the multi-position switch device so that the control unit effects a change of the active signal pathway through the multiplexer to implement the user-selected wiring configurations.

Embodiment 2 is the wireless switching system of embodiment 1, wherein the multi-position switch device has five selector positions.

Embodiment 3 is the wireless switching system of embodiments 1 or 2, wherein the pickup location comprises at least one of bridge, middle, and neck.

Embodiment 4 is the wireless switching system of any of embodiments 1 through 3, wherein the instructions further cause the computer system to: save a user's selected pickup wiring configuration as a preset pickup configuration that is selectable by the user at a later time.

Embodiment 5 is the wireless switching system of any of embodiments 1 through 4, wherein the instructions further cause the computer system to: save a set of pickup wiring configurations as a single recallable preset configuration that is selectable by the user at a later time, the set comprising the user's selected pickup wiring configuration for each selector position of the multi-position switch device.

Embodiment 6 is the wireless switching system of any of embodiments 1 through 5, wherein the instructions further cause the computer system to: save a plurality of sets of pickup wiring configurations as unique recallable preset configurations that are selectable by the user at a later time, each set comprising a unique combination of the user's selected pickup wiring configurations for each selector position of the multi-position switch device.

Embodiment 7 is the wireless switching system of any of embodiments 1 through 6, wherein the selector comprises at least one of a lever, toggle, slide, and rotor.

Embodiment 8 is the wireless switching system of any of embodiments 1 through 7, wherein the selector is at least one of mechanically and electrically operated.

Embodiment 9 is the wireless switching system of any of embodiments 1 through 8, wherein the wiring configuration data comprises inter-coil wiring configuration data.

Embodiment 10 is the wireless switching system of any of embodiments 1 through 9, wherein the at least one pickup comprises a single coil pickup.

Embodiment 11 is the wireless switching system of any of embodiments 1 through 10, wherein the pickup configuration data comprises at least one of standard, reverse, and off.

Embodiment 12 is the wireless switching system of any of embodiments 1 through 11, wherein the at least one pickup comprises a multiple coil pickup.

Embodiment 13 is the wireless switching system of any of embodiments 1 through 12, wherein the pickup configuration data comprises at least one of standard north coil, standard south coil, standard full, reverse north coil, reverse south coil, reverse full, parallel reverse, and phased parallel reverse.

Embodiment 14 is the wireless switching system of any of embodiments 1 through 13, wherein the wiring configuration comprises at least one of clockwise, counter-clockwise, top coming, and top going.

Embodiment 15 is the wireless switching system of any of embodiments 1 through 14, wherein the display device comprises a portable electronic device.

Embodiment 16 is a method for wirelessly configuring a multi-position switch system for stringed musical instruments, comprising: (1) providing a multi-position switch device configured for installation on a stringed musical instrument having a plurality of pickups mounted thereupon, the multi-position switch device having: (a) a selector movable between a plurality of positions, each position establishing a portion of a signal pathway from pickup inputs to an output, the selector operable by a user to effect a change in the electrical signal pathway between the pickup inputs and the output; (b) a multiplexer configured to provide multiple configurable signal pathways between the pickup inputs and the output; (c) a control unit having a processor in data communication with a memory unit and a wireless communications unit, the control unit configured to determine the active signal pathway through the multiplexer; (2) inputting pickup configuration data related to the wiring configuration that determines sound output of the pickups mounted on the stringed musical instrument into a computer system, the pickup configuration data comprising: (a) selector position data that indicates the current position of the multi-position switch system in which the selector is positioned; (b) pickup location data that indicates the location of each pickup mounted on the stringed musical instrument for the indicated selector position; and (c) wiring configuration data for each pickup mounted on the stringed musical instrument at the indicated selector position; (3) interacting, with a computer system providing, on a display device, an interactive presentation of the pickup locations and wiring configurations for each pickup for the indicated selector position, to: (a) select a pickup at a particular location for the indicated selector position, and (b) change the wiring configuration for the selected pickup for the indicated selector position; and (4) wirelessly communicating the selected wiring configurations for the indicated selector position of the multi-position switch device to the control unit of the multi-position switch device so that the control unit effects a change of the active signal pathway through the multiplexer to implement the selected wiring configuration.

Embodiment 17 is the method of embodiment 16, further comprising the step of saving a selected pickup wiring configuration as a preset pickup configuration that is selectable at a later time.

Embodiment 18 is the method of embodiment 16 or 17, further comprising the step of: saving a set of pickup wiring configurations as a single recallable preset configuration that is selectable at a later time, the set comprising the selected pickup wiring configuration for each selector position of the multi-position switch device.

Embodiment 19 is the method of any of embodiments 16 through 18, further comprising the step of: saving a plurality of sets of pickup wiring configurations as unique recallable preset configurations that are selectable at a later time, each set comprising a unique combination of selected pickup wiring configurations for each selector position of the multi-position switch device.

Embodiment 20 is the method of any of embodiments 16 through 19, wherein the selector comprises at least one of a lever, toggle, slide, and rotor.

Embodiment 21 is the method of any of embodiments 16 through 20, wherein the selector is at least one of mechanically and electrically operated.

Embodiment 22 is the method of any of embodiments 16 through 21, wherein the wiring configuration data comprises inter-coil wiring configuration data.

Embodiment 23 is the method of any of embodiments 16 through 22, wherein the at least one pickup comprises a single coil pickup.

Embodiment 24 is the method of any of embodiments 16 through 23, wherein the pickup configuration data comprises at least one of standard, reverse, and off.

Embodiment 25 is the method of any of embodiments 16 through 24, wherein the at least one pickup comprises a multiple coil pickup.

Embodiment 26 is the method of any of embodiments 16 through 25, wherein the pickup configuration data comprises at least one of standard north coil, standard south coil, standard full, reverse north coil, reverse south coil, reverse full, parallel reverse, and phased parallel reverse.

Embodiment 27 is the method of any of embodiments 16 through 26, wherein the wiring configuration comprises at least one of clockwise, counter-clockwise, top coming, and top going.

Embodiment 28 is the method of any of embodiments 16 through 27, wherein the display device comprises a portable electronic device.

A computer program product embodied in a non-transitory computer readable storage medium and comprising computer instructions for: (1) establishing a wireless data connection between a user's computing device and a multi-position switch device mounted on a stringed instrument, the multi-position switch device having a control unit comprising a processor, a memory unit, and a wireless communications unit; (2) receiving pickup configuration data that is input by the user and related to the wiring configuration that determines sound output of pickups mounted on the user's stringed musical instrument, the pickup configuration data comprising: (a) pickup location on the user's stringed instrument for a given selector position selected by the user; and (b) wiring configuration for a given pickup at a given selector position selected by the user; (3) providing, on a display device, an interactive presentation of the pickup locations and selected wiring configurations for each pickup for each selector position; and (4) wirelessly communicating the user-selected pickup configuration data for each selector position of the multi-position switch device to the control unit of the multi-position switch device so that the control unit effects one or more signal pathways through the multi-position switch device to implement the user-selected wiring configurations.

Embodiment 30 is the computer program product of embodiment 29, further comprising computer instructions for: saving a selected pickup wiring configuration as a preset pickup configuration that is selectable at a later time.

Embodiment 31 is the computer program product of embodiments 29 or 30, further comprising computer instructions for: saving a set of pickup wiring configurations as a single recallable preset configuration that is selectable at a later time, the set comprising the selected pickup wiring configuration for each selector position of the multi-position switch device.

Embodiment 32 is the computer program product of any of embodiments 29 through 31, further comprising computer instructions for: saving a plurality of sets of pickup wiring configurations as unique recallable preset configurations that are selectable at a later time, each set comprising a unique combination of selected pickup wiring configurations for each selector position of the multi-position switch device.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The wireless switching system for musical instruments and related methods disclosed herein boasts a variety of inventive features and components that warrant patent protection, both individually and in combination.

Disclosed herein are pickup configuration switching systems for use with stringed musical instruments (e.g., guitars) to enable a user to seamlessly switch between pickup configurations without having to adjust the wiring between the switch and the pickups. In one example aspect, a system includes a musical instrument having a plurality of pickups attached thereto, a switch device mounted on the musical instrument and in electronic communication with the plurality of pickups, a computer or computing device configured for wireless data communication with the switch device, and a switch management software application program (or "app") stored on and executable by the computing device, in which a user is able to use the switch management app to remotely change the pickup configuration of the user's instrument without having to rewire the switch device.

Figure 1:
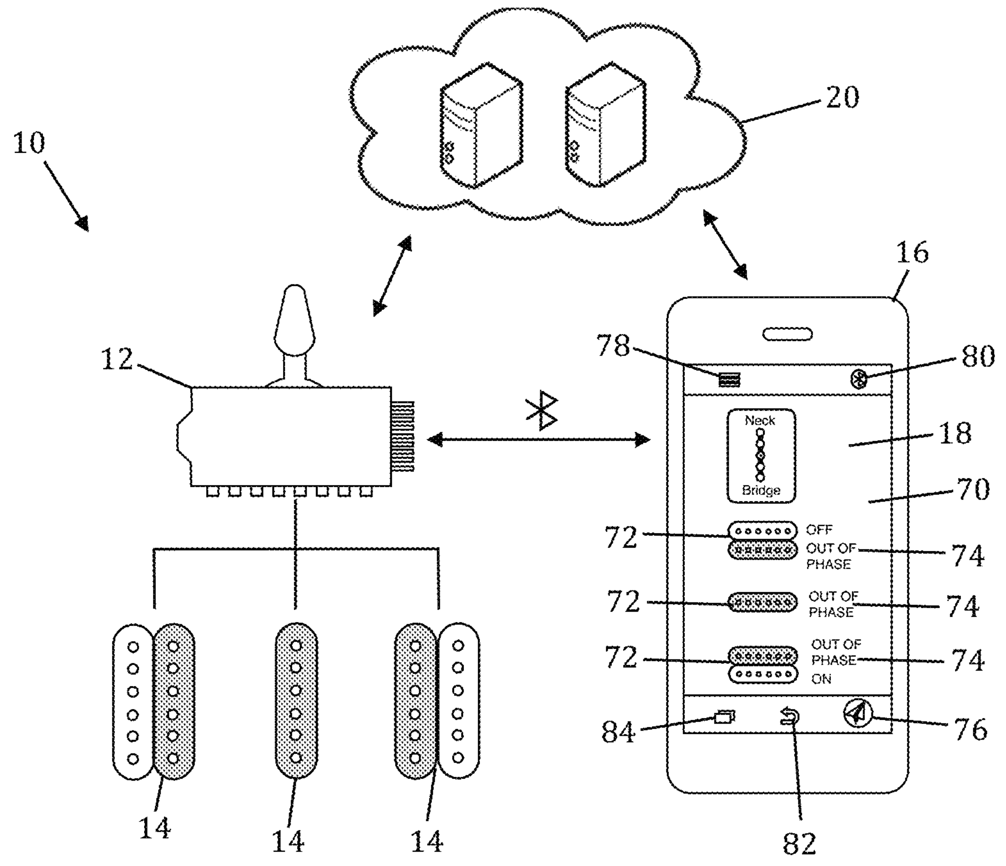
FIG. 1 is a block diagram representing an example of a wireless switching system according to some embodiments of the disclosure.

FIG. 1 illustrates one example of a switching system 10 according to some embodiments of the disclosure. By way of example only, the switching system 10 may include a multi-position switch device 12 mounted to a user's stringed musical instrument and electronically connected (e.g. via wires) to a plurality of pickups 14 that are also mounted to the user's stringed musical instrument. The pickups 14 may be of single-coil or dual-coil (so-called humbucker) design. In either case, each pickup 14 includes an internally disposed permanent magnet having one or more pole pieces and a coil created by winding a copper wire typically thousands of times around the magnet. When metallic strings (e.g. nickel, steel, etc.) are plucked adjacent to the pole pieces, the magnetic field of the strings moves relative to the fixed magnetic field of the pickup 14 to generate an electrical signal that may be transmitted (e.g., via a connected cable or wirelessly) to an amplifier and/or recording device. The switch device 12 is operable to change the configuration of the pickups by changing the phase combination (e.g., "in phase," "out-of-phase," or "off") of the pickups 14 or the coil configuration (e.g., series or parallel) of each pickup 14, and is in wireless communication to a user's computing device 16. By way of example only, the computing device 16 may include a mobile computing and communication device (e.g., a smart phone, tablet computer, laptop computer, personal digital assistant, etc.), a stationary computing device (e.g. desktop computer, workstation, etc.) and/or a wearable computing device (e.g., a smart watch, smart glasses, etc.). In some implementations, the computing device 16 may be in communication with other computing devices, such as a laptop and/or desktop computer, a smart television, or network-based server computer. The system 10 further includes an interactive switch management software application (or "app") 18 stored on and executable by the computing device 16, and wirelessly associated with the switch device 12 and/or other smart accessories/devices of the switching system 10.

In some embodiments, the interactive switch management app 18 may be embodied in a non-transitory computer-readable storage medium and may comprise a set of instructions that when executed by a processor cause the computing device 16 to perform the various functions described herein (e.g., present selectable display icons to a user on the user interface of the computing device 16 that represent pickup coil configurations on the user's stringed instrument, receive input from the user via the user interface regarding the user's desired coil configuration, and wirelessly communicate with the switch device 12 mounted on the user's stringed instrument to implement the desired coil configuration as selected by the user).

In some embodiments, the system 10 may include a data processing system 20 in communication with the computing device 16 and/or the switch device 12. The data processing system 20 can include one or more computing devices in a computer system or communication network accessible via the Internet (also referred to as "the cloud"), e.g., including servers and/or databases in the cloud.

In some embodiments, the computing device 16 and/or app 18 may receive other data from the instrument, for example lever position, potentiometer position, accelerometer position, buttons, digital audio streams, etc.

In some embodiments, the switching system 10 of the present disclosure may be configured for use with a variety of musical instruments, for example stringed instruments. By way of example, the stringed instruments may be fretted (e.g., guitars, banjoes, mandolins, etc.) or non-fretted (e.g. violins, violas, cellos, and the like).

The interactive switch management app 18 of the computing device 16 associated with the switch device 12 provides a user interface to allow the user to manage his/her switch configuration, as well as other data captured from the instrument. In some implementations, for example, the interactive switch management app 18 can be configured to control some functionalities of the instrument. In some implementations, for example, the interactive switch management app 18 provides an interactive user interface to allow a user to manage settings of the instrument, including but not limited to the tone settings of the pickups 14, and settings for the computing device 16 (e.g., smart phone, tablet, laptop or wearable computing device) that can affect the functionality of the system 10 and/or instrument. In some implementations, for example, the computing device 16 is an independent portable device that the user may carry on his/her person. In example embodiments of the independent portable computing device 16, the computing device 16 includes at least a data processing unit 22, a display unit 24 including a user interface 70 (e.g. preferably a touch screen interface), and a wireless communication unit 26 to allow the computing device 12 to communicate with the switch device 12 (See, e.g., FIG. 2).

As shown by way of example only in FIG. 1, the interactive switch management app 18 includes a set of algorithms or instructions that cause the computing device 16 to display a plurality of display icons on the user interface 70. In some embodiments, the user interface 70 may comprise a touch-screen interface, and these display icons may be selectable by the user to enable the user to communicate instructions to the app 18 by selecting or tapping on the display icon. For example, the computing device 16 may display pickup configuration icons 72 that may be color-coded to indicate pickup configuration (e.g., in-phase, out-of-phase, or off), as well as text labels 74 (e.g., "IN PHASE," "OUT OF PHASE," and/or "OFF") positioned next to the pickup configuration icons 72 to provide additional indication of pickup configuration. By way of example, if the user wants to change the configuration of one or more pickups 14 (e.g. to change the sound produced by the stringed instrument), the user may select or tap the corresponding pickup configuration icon 72, which causes a the computer to display a selectable popup menu with the configuration options (e.g. in-phase, out-of-phase, or off) for that pickup. The user may then select a desired configuration by tapping on the desired option. This process may be repeated to change the configuration of multiple pickups. When the user has finished making the selections, the user may tap on a "send" icon 76 (for example) to cause the computer 16 to wirelessly transmit (e.g., by way of the wireless communications unit 26 (FIG. 2)) the switching instructions to the mounted switch device 12, which then implements the instructions by switching the pickup coil configuration on the stringed instrument as indicated.

By way of example only, the computer may display additional display icons (which may be interactive) on the user interface 70, including but not limited to a drop-down software menu icon 78, which may include selections such as "save", "quit", "preferences", etc., a wireless connectivity icon 80 (e.g. to indicate Bluetooth connectivity, Wifi connectivity, and the like), a "back" icon 82 to return to a previous configuration, and a windows icon 84 to toggle between open app windows. Display icons other than those shown by way of example in FIG. 1 may be used by the app if needed (See, e.g., FIGS. 23-28).

By way of example only, the switch device 12 is substantially similar to analog switch mechanisms currently available, with the primary exception being that the switch device 12 of the wireless switching system 10 disclosed herein includes a wireless receiver and processor to receive instructions from the computing device 16 and switch management app 18, and a multiplexer (MUX) to implement the received instructions by seamlessly reconfiguring the wiring to the pickups 14 to configure (or reconfigure) the pickups 14 in the manner selected by the user by way of the user interface of the switch management app 18. Once the phase and coil configurations of the pickups 14 are set, then the switch device 12 may operate mechanically like any other toggle switch to enable the user to toggle between selected pickup configurations to optimize the sound output, for example during a live performance. Once the onboard processor has been programmed via the app, the switching system can operate totally independent of the app, enabling the app and Bluetooth communication to the turned off, thus conserving power.

Figure 2:
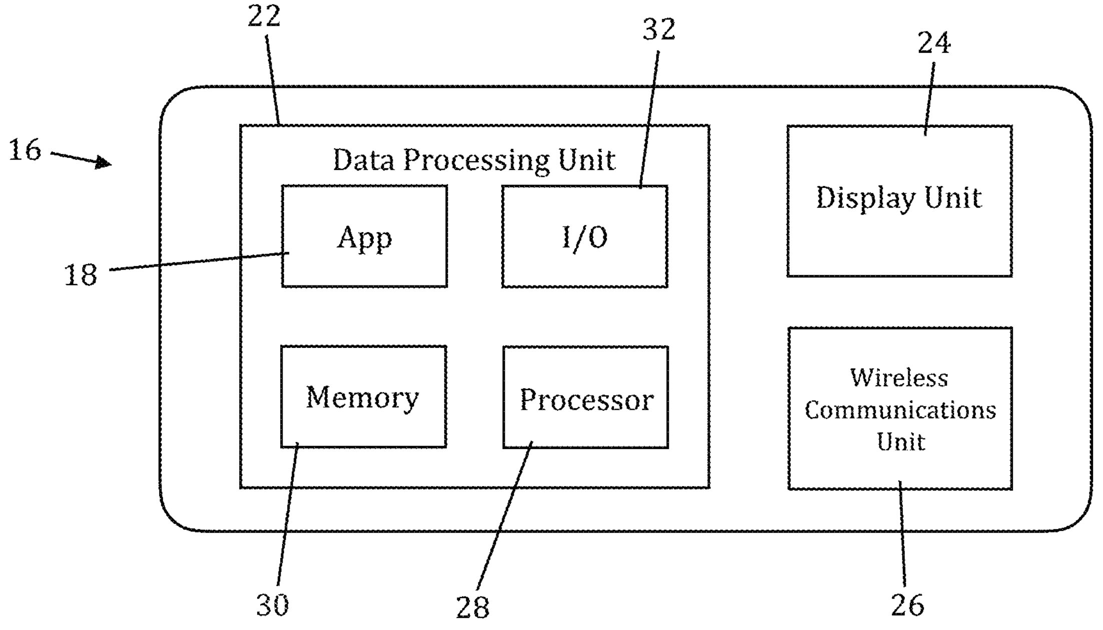
FIG. 2 is a block diagram representing an example of a computing device forming part of the wireless switching system of FIG. 1, according to some embodiments.

FIG. 2 shows a block diagram depicting an example of a computing device 16 of the wireless switching system 10, according to some embodiments. By way of example only, the computing device 16 of the wireless switching system 10 includes a data processing unit 22, a display unit 24, and a wireless communications unit 26. The data processing unit 22 of the computing device 16 includes a processor 28 to process data, a memory unit 30 in communication with the processor 28 to store data, and an input/output unit (I/O) 32 to interface the processor 28 and/or memory 30 to other modules, units or devices of the computing device 16 or external devices. For example, the processor 28 can include a central processing unit (CPU) or a microcontroller unit (MCU). For example, the memory 30 can include and store processor-executable code, which when executed by the processor 28, configures the data processing unit 22 to perform various operations, e.g., such as receiving information, commands, and/or data, processing information and data, transmitting or providing information/data to another device, for example using Musical Instrument Digital Interface or MIDI protocol. In some implementations, the data processing unit 22 can transmit raw or processed data to a computer system or communication network accessible via the Internet (referred to as 'the cloud') that includes one or more remote computational processing devices (e.g., servers in the cloud). To support various functions of the data processing unit, the memory 30 can store information and data, such as instructions, software, values, images, and other data processed or referenced by the processor 28. For example, various types of Random Access Memory (RAM) devices, Read Only Memory (ROM) devices, Flash Memory devices, and other suitable storage media can be used to implement storage functions of the memory unit 30. The I/O 32 of the data processing unit 22 can interface the data processing unit 22 with the wireless communications unit 26 to utilize various types of wired or wireless interfaces compatible with typical data communication standards, for example, which can be used in communications of the data processing unit 22 with other devices via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoper-ability for Microwave Access (WiMAX)), 3G/4G//5G/LTE cellular communication methods, NFC (Near Field Communication), and parallel interfaces. The I/O 32 of the data processing unit 22 can also interface with other external interfaces, sources of data storage, and/or visual or audio display devices, etc. to retrieve and transfer data and information that can be processed by the processor 28, stored in the memory unit 30, or exhibited on an output unit of the computing device 16 or an external device. For example, a display unit 24 of the computing device 16 can be configured to be in data communication with the data processing unit 22, e.g., via the I/O 32, to provide a visual display, an audio display, and/or other sensory display that produces the user interface (e.g., the GMI 16) of the switch management app 18. In some examples, the display unit 24 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

In some embodiments, the switching system of the present disclosure includes a simple user interface (UI) 70 (See, e.g., FIG. 24) including a touch screen interface in which the user is able to easily communicate selections or instructions to the processor 28 (e.g., by touching selections on the display unit 24 presented by the processor 28 via the switch management app 18) to instruct the processor 28 to perform certain tasks (e.g., changing the coil settings, etc.).

Figure 3:
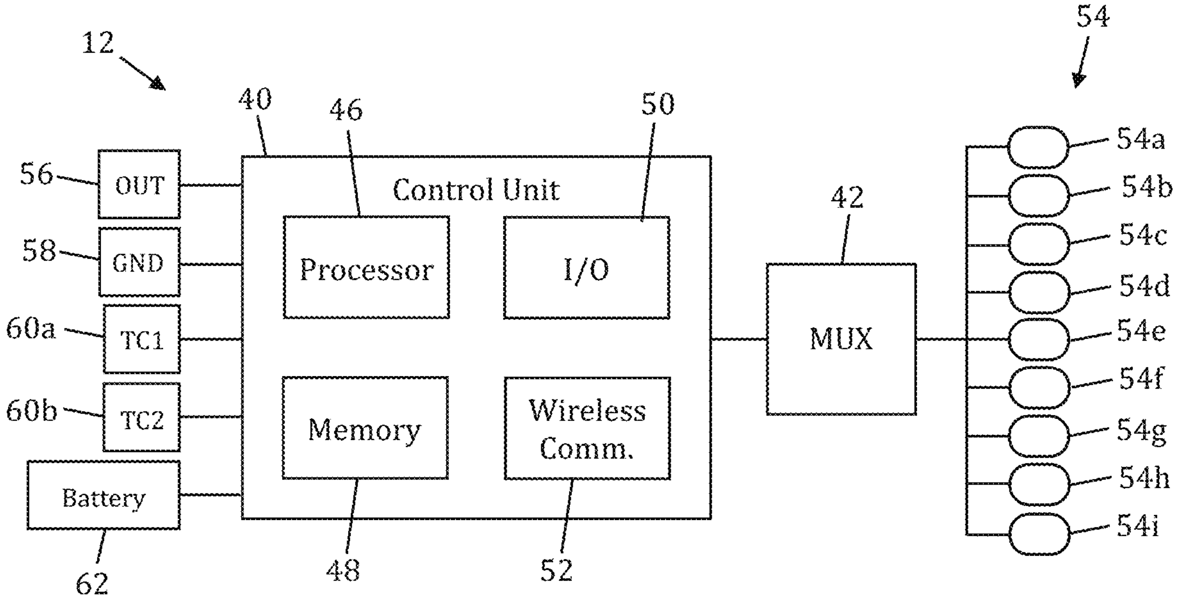
FIG. 3 is a block diagram representing a switch device forming part of the wireless switching system of FIG. 1, according to some embodiments.
Figure 4:
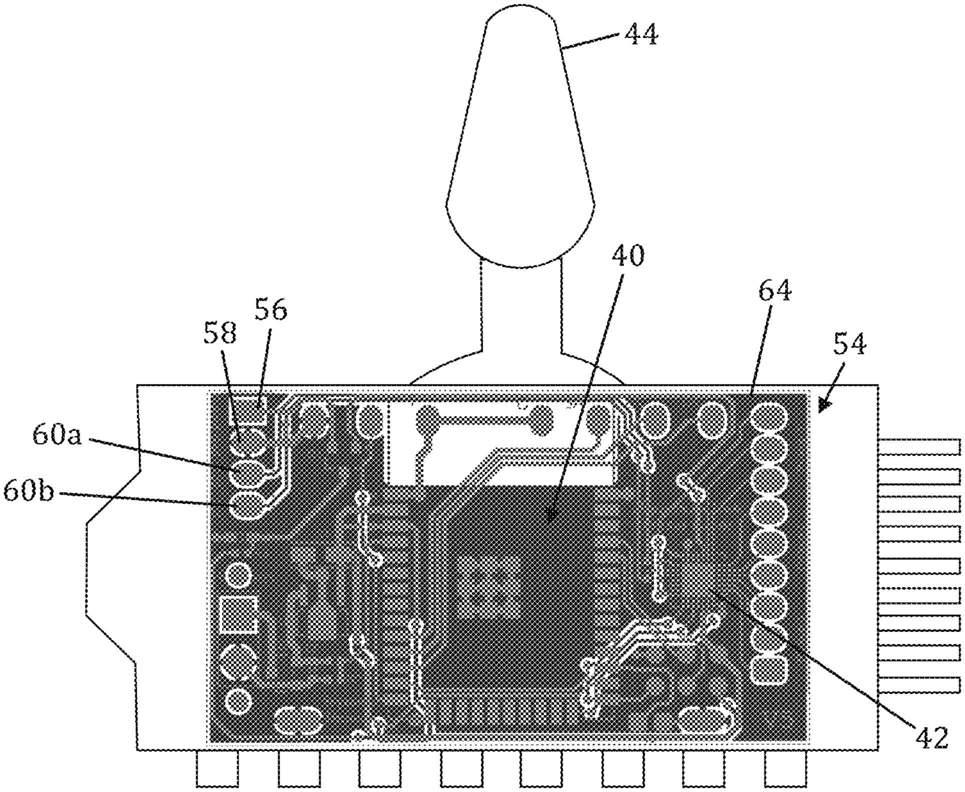
FIG. 4 is another block diagram representing a switch device forming part of the wireless switching system of FIG. 1, according to some embodiments.

By way of example only, FIGS. 3 and 4 are block diagrams depicting an example of a switch device 12 according to some embodiments. By way of example only, the switch device 12 disclosed herein comprises a control unit 40, a multiplexer ("MUX") 42, and a lever 44. In some embodiments, the control unit 40 comprises a processor 46 to process data (e.g. which may be a microprocessor), memory unit 48 in communication with the processor 46 to store data, and input/output (I/O) 50 to interface the processor 46 and/or memory 48 to other modules, units or devices of the switch device 12 or external devices, and a wireless communications module 52. The control unit 40 is in electronic communication with the MUX 42, which may be in electronic communication with a plurality of switch inputs 54, an output connector 56 (e.g. for connecting with an amplifier and/or recording device), and a ground connector 58. In some embodiments, the control unit may further be in electronic communication with one or more tone controls 60 (for example, the present disclosure describes a pair of tone controls 60*a*, 60*b*), and a battery 62. By way of example only the various components may be arranged on a printed circuit board (PCB) 64, and the electronic communication may be achieved by way of electrical traces connecting the various components.

For example, the processor 46 can include a central processing unit (CPU) or a microcontroller unit (MCU). For example, the memory 48 can include and store processor-executable code, which when executed by the processor 46, configures the control unit 40 to perform various operations, e.g., such as receiving information, commands, and/or data, processing information and data, transmitting or providing information/data to another device (e.g., computing device 16), and controlling the MUX 42, for example using Musical Instrument Digital Interface or MIDI protocol. In some implementations, the control unit 40 can transmit raw or processed data to a computer system or communication network accessible via the Internet (referred to as 'the cloud') that includes one or more remote computational processing devices (e.g., servers in the cloud). To support various functions of the data processing unit, the memory 48 can store information and data, such as instructions, software, values, images, and other data processed or referenced by the processor 46. For example, various types of Random Access Memory (RAM) devices, Read Only Memory (ROM) devices (e.g., including but not limited to electrically erasable programmable read-only memory (EEPROM)), Flash Memory devices, and other suitable storage media can be used to implement storage functions of the memory unit 48. The I/O 50 of the control unit 40 can interface the control unit 40 with the wireless communications unit 52 to utilize various types of wired or wireless interfaces compatible with typical data communication standards, for example, which can be used in communications of the control unit 40 with other devices via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoper-ability for Microwave Access (WiMAX)), 3G/4G/LTE cellular communication methods, NFC (Near Field Communication), and parallel interfaces. The I/O 50 of the control unit 40 can also interface with other external interfaces, sources of data storage, and/or visual or audio display devices, etc. to retrieve and transfer data and information that can be processed by the processor 46, stored in the memory unit 48, or exhibited on an output unit of the computing device 16 or an external device.

In some embodiments, the multiplexer 42 is a signal routing device having a plurality of electronic switches that are operable to control the open circuit pathways between the pickups 14 (via the pickup inputs 54) and the output 56 (e.g., amplifier and/or recording device). The MUX 42 opens and closes the pathways in response to instructions received from the processor 46, which in turn receives configuration instructions (by way of the wireless communication unit 52) from the computing device 16, as selected by the user. See, e.g., FIGS. 9-20 for example pickup and MUX pathway configurations. Thus, the user is able to select a pickup configuration for each lever position of a multi-position switch device 12 to generate the desired sound type during a performance. In some embodiments, the number of usable switch configurations at any one time may correspond to the number of switch positions on a switch device. For example, for a 5-way switch device (e.g. a switch device having a lever 44 with five positions), a user would typically configure and save 5 different switch configurations using the app 18 on a connected computing device 16. The computing device 16 then wirelessly sends the instructions to the control unit 40 of the switch device 12, which configures the MUX 42 for each lever position (as selected by the user) to produce 5 unique sounds, between which the user may toggle by manually operating the lever 44 while using the instrument, for example. If the user later decides to change one (or more) of the five saved pickup configurations, the user may simply use the app 18 (e.g., see below) to instruct the switch device 12 to change the pathway configuration of the MUX 42 to produce new pickup configurations without having to manually rewire the instrument pickups.

In some embodiments, the user may save pickup configurations as presets within the app 18, which may be selected at a later time period to save time.

Figure 5:
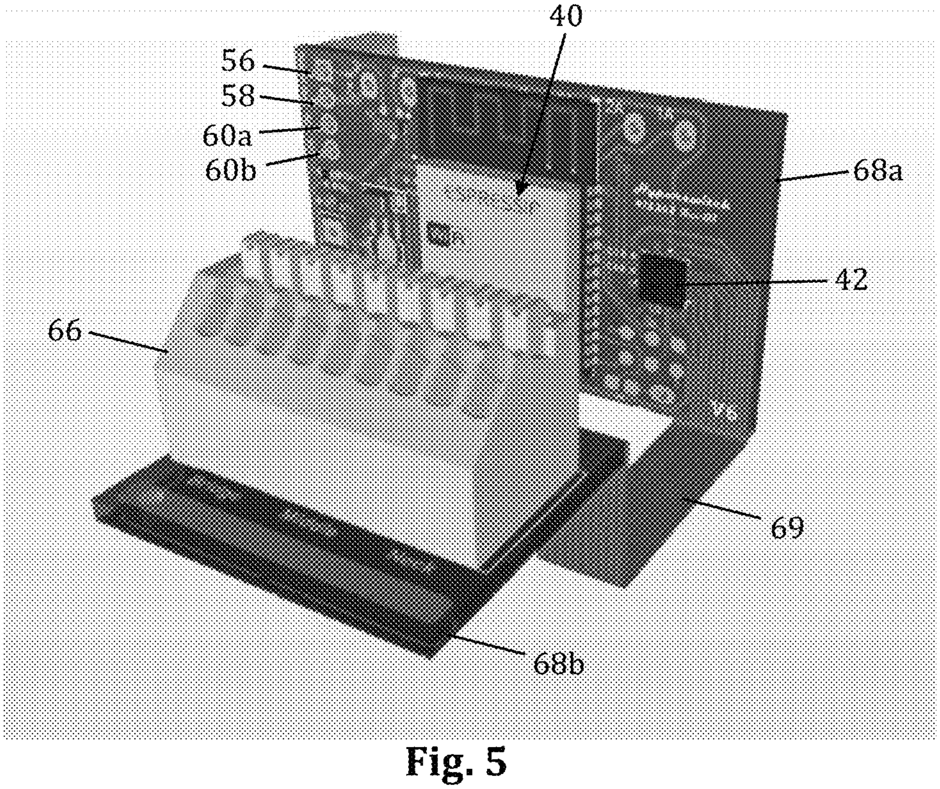
FIG. 5 is a perspective view of an example of a switch device forming part of the wireless switching system of FIG. 1, according to some embodiments.
Figure 6:
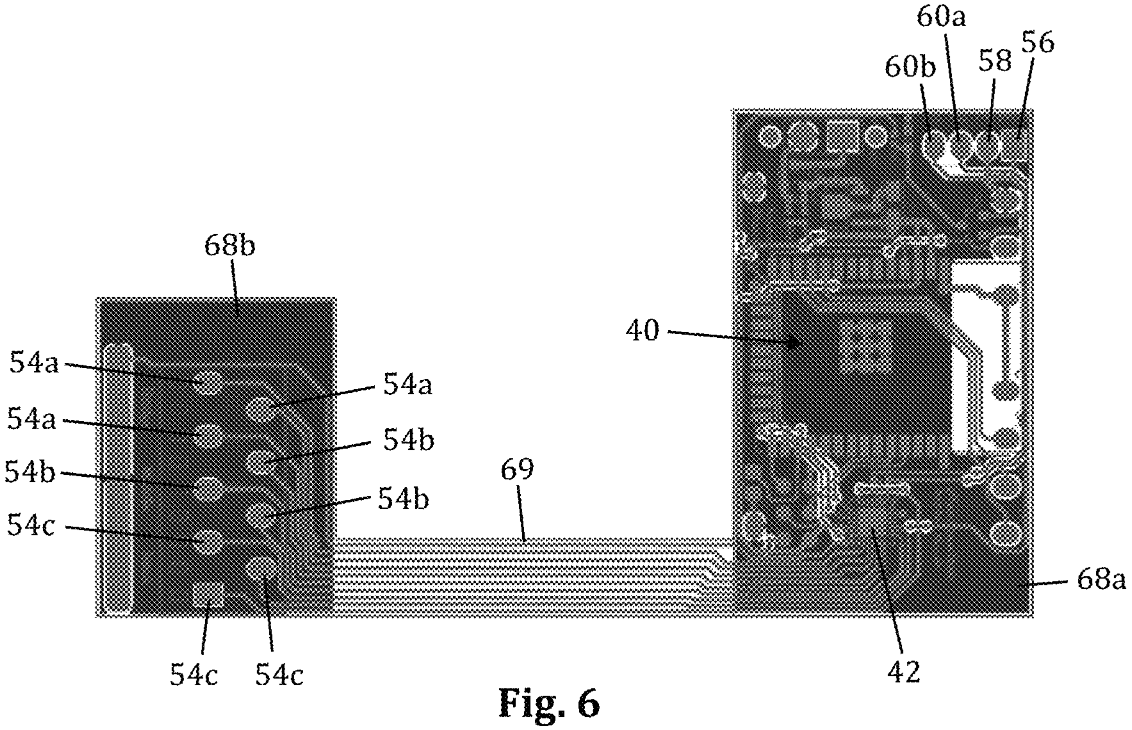
FIG. 6 is a top view of a printed circuit board forming part of the switch device of FIG. 5, according to some embodiments.
Figure 7A:
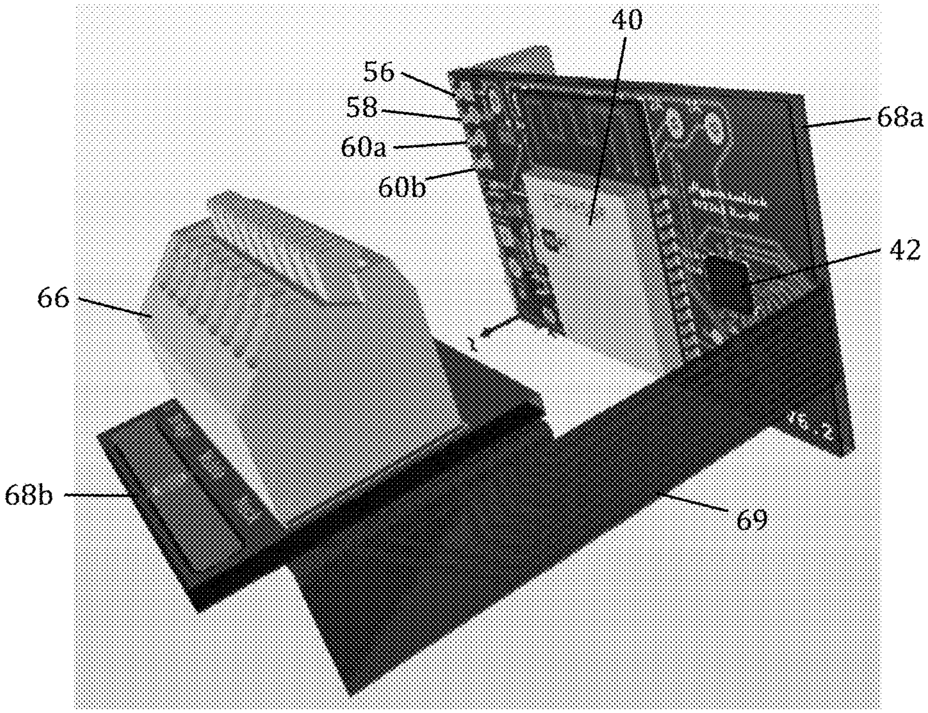
FIG. 7A is a perspective view of another example of a switch device forming part of the wireless switching system of FIG. 1, according to some embodiments.
Figure 7B:
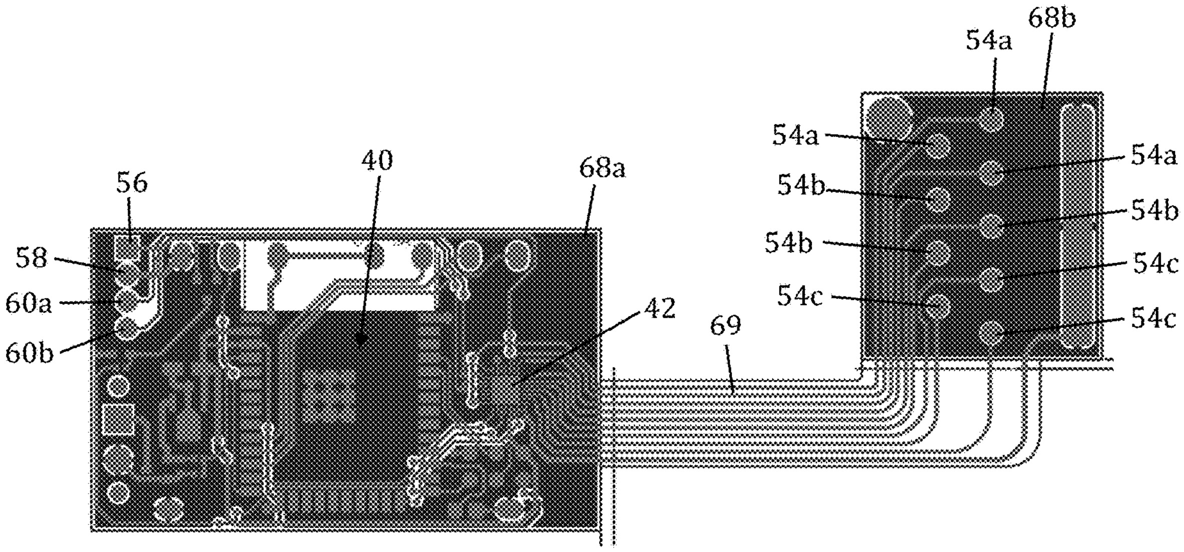
FIG. 7B is a top view of a printed circuit board forming part of the switch device of FIG. 8, according to some embodiments.

By way of example, the pickups 14 are hard-wired into a terminal block 66 (e.g. FIG. 5), which is in electrical communication with the pickup inputs 54. In some embodiments, one or more pickup inputs 54 are associated with each pickup 14. In some embodiments, for example, the pickups 14 may be connected so that three pickup inputs 54 may be associated with each particular pickup position. For example in a guitar, a typical user may install pickups 14 in three different locations (e.g., bridge, middle, and/or neck, however other specific locations are possible). In such an embodiment, the switch device 12 may be configured so that a first trio of pickup inputs 54*a* are associated with a first pickup 14 (e.g. bridge pickup), a second trio of pickup inputs 54*b* are associated with a second pickup 14 (e.g. middle pickup), and a third trio of pickup inputs 54*c* are associated with a third pickup 14 (e.g. neck pickup).

In some embodiments, the control unit 40 may be in electric communication with one or more tone controls 60*a*, 60*b*, which each comprise a tone capacitor wired in series with a tone control on the instrument. In some embodiments, by interacting with the app 18, the user is able to change the tone control capacitor values for one or both tone controls (e.g., in a dual-tone guitar). This may be accomplished by allowing a new capacitor value to be switched in series with the existing one on the instrument (e.g. cutting the capacitor value by up to about half). Additionally, the app 18 provides the user with the ability to select which tone controls 60*a*, 60*b* are active on any dual tone instrument. This gives more flexibility to the user in creating new tonalities not possible previously. By way of example, this flexibility may be in the form of (at least) four different available tone options (e.g. on a dual tone instrument) achievable by a) adjusting a single tone control on the instrument, b) adjusting both tone controls on the instrument, c) changing the tone capacitor values of one of the tone controls on the instrument using the app 18, and d) changing the tone capacitor values of both of the tone controls on the instrument using the app 18.

In some embodiments, the various electrical components described herein may be arranged on a single rigid printed circuit board (PCB) 64. In some embodiments, the various components may be arranged on two or more PCBs, including one or more rigid portions 68*a*, 68*b* (e.g., motherboard 68*a* and daughterboard 68*b*) and one or more flexible portions 69, as shown by way of example only in FIGS. 5-7B. In some embodiments, the control unit 40, MUX 42, output connectors 56, ground connector 58, tone controls 60*a*, 60*b*, and/or battery 62 may be located on a first rigid portion 68*a* and the pickup inputs 54 (or pickup input header) may be located on a second rigid portion 68*b*, while the electrical traces extending between the pickup inputs 54 and the MUX 42 are located on a flexible portion 69 connecting the two rigid portions 68*a*, 68*b*. In some embodiments, by way of example, such a rigid-flexible-rigid configuration enables greater flexibility in placement and installation of the switch device 12 within a stringed musical instrument, which for example may simplify installation and reduce the amount of wiring inside the instrument. In some embodiments, the rigid-flex-rigid configuration enables the pickup input header (including the pickup inputs 54) to be located remotely on top of the volume potentiometer, which would greatly simplify wiring and wire routing, especially in instances in which the switch device 12 is being retrofitted into an existing pickup installation.

In some embodiments, the PCB 64 may be arranged so that the pickup inputs 54 are located on the right side of the PCB 64 and the output connector 56, ground connector 58, tone control connectors 60*a*, 60*b*, and battery or battery connector 62 may be located on the left side of the PCB 64, with the control unit 40 and MUX 42 located in or near the middle of the PCB 64. This configuration makes the wire routing more direct and reduces crossovers. In addition, this configuration enables the tone controls 60*a*, 60*b* to be pre-harnessed and plugged directly into the PCB 64 rather than having to insert individual wires into screw terminals.

In some embodiments, the battery and/or battery connector 62 may include polarity protection, which may prevent destruction of the 3V regulator and other key active components if the user accidently hooks up the battery backwards.

Figure 8A:
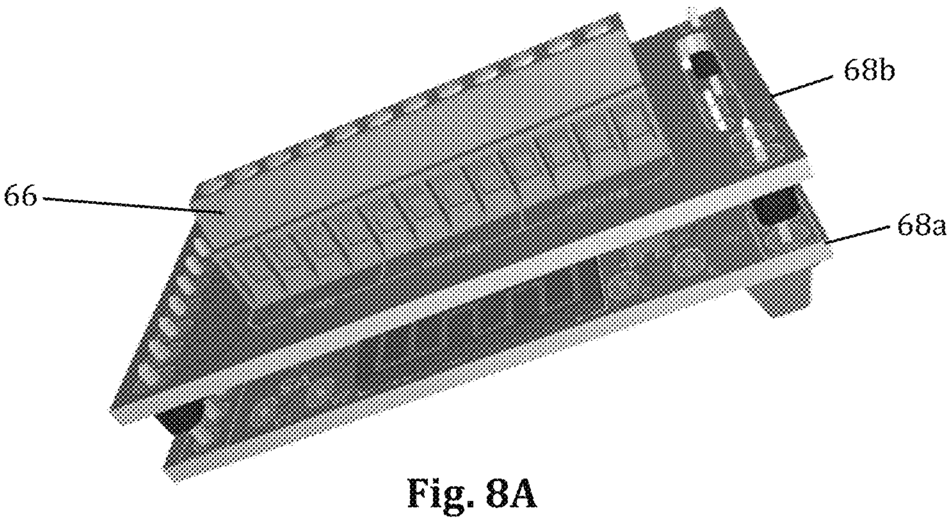
FIGS. 8A-8C are perspective views of another example of a switch device forming part of the wireless switching system of FIG. 1, according to some embodiments.
Figure 8B:
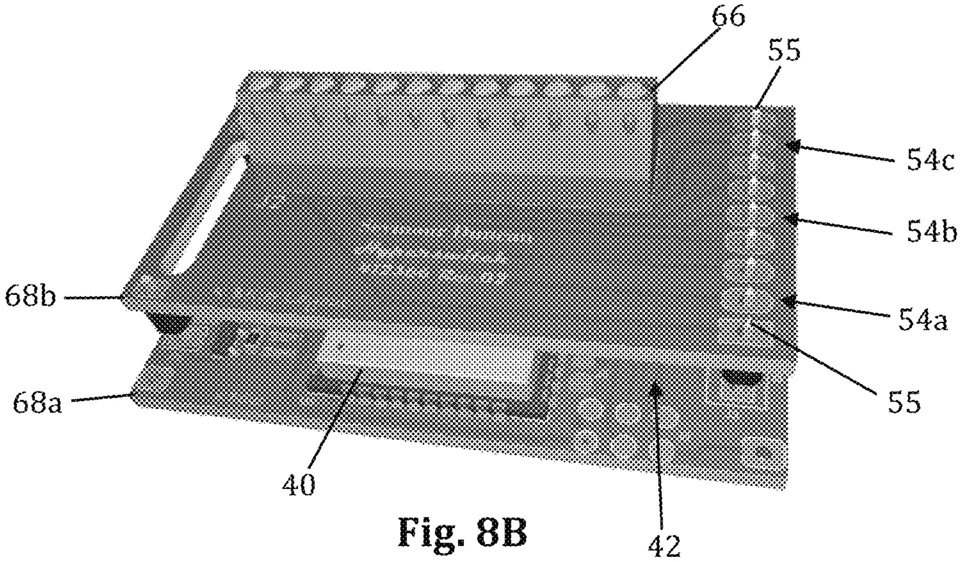
Figure 8C:
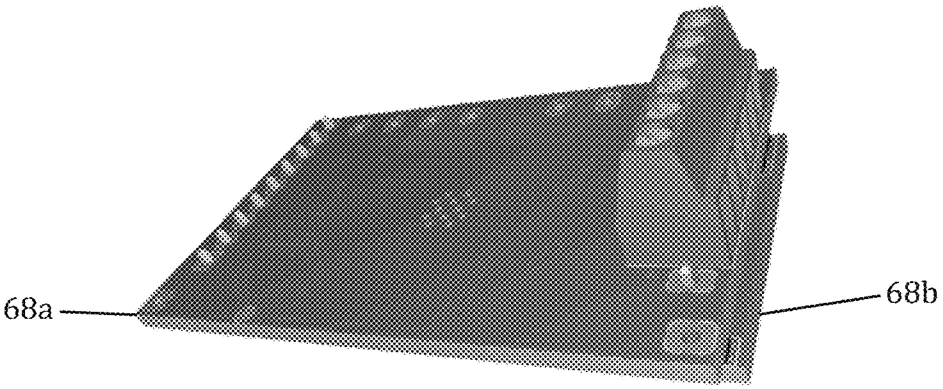

In some embodiments, the rigid portions 68*a*, 68*b* may be arranged in a stacked configuration as shown by way of example only in FIGS. 8A-8C. By way of example only, FIG. 8A is a perspective view of a stacked configuration in which the rigid portion 68*a* is positioned directly beneath the rigid portion 68*b*, FIG. 8B illustrates the stacked configuration of FIG. 8A rotated approximately 180°, and FIG. 8C is a perspective view of the bottom of the stacked configuration of FIG. 8A. This configuration is advantageous in that it may be easier for a user to install, eliminates the need for a flexible portion 69 described above, and may occupy less space within the instrument. By way of example, any of the various features and components of the PCB 64 and/or rigid portions 68*a*, 68*b* described above may also be present in any combination or configuration on the stacked embodiment of FIGS. 8A-8C. By way of example, the rigid portion 68*a* (e.g., motherboard) may be positioned directly beneath the rigid portion 68*b* (e.g., daughterboard), with the electrical connection between the portions 68*a*, 68*b* (for example between the MUX 42 (not visible in FIGS. 8A-8C) and the pickup inputs 54*a*-54*c*) being achieved by way of rigid posts 55 instead of the flexible portion 69 described above.

FIGS. 9-20 illustrate several examples of switch configurations, including example wiring pathways within the multiplexer (MUX) 42, for any one pickup to be used in conjunction with other pickups (for example) to create the desired tonal sounds. As previously mentioned, and by way of example only, most electric guitars have two or three magnetic pickups. A combination of pickups is called a pickup configuration, usually notated by writing out the pickup types in order from bridge pickup through mid pickup(s) to neck pickup, using “S” for single-coil and “H” for humbucker. The pickups shown by way of example in FIGS. 9-20 may be arranged in any combination and in any order that suits the preference of the player.

Figure 9:
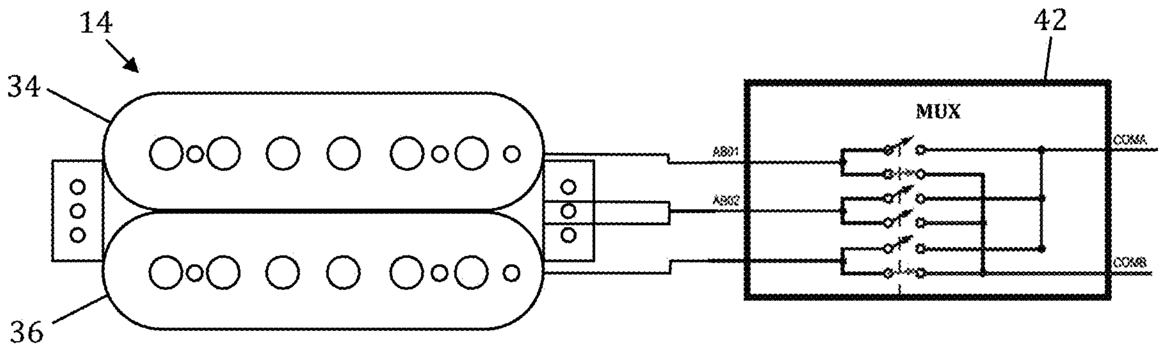
FIGS. 9-20 are schematic diagrams of example pickup configurations forming part of the wireless switching system of FIG. 1, according to some embodiments.
Figure 10:
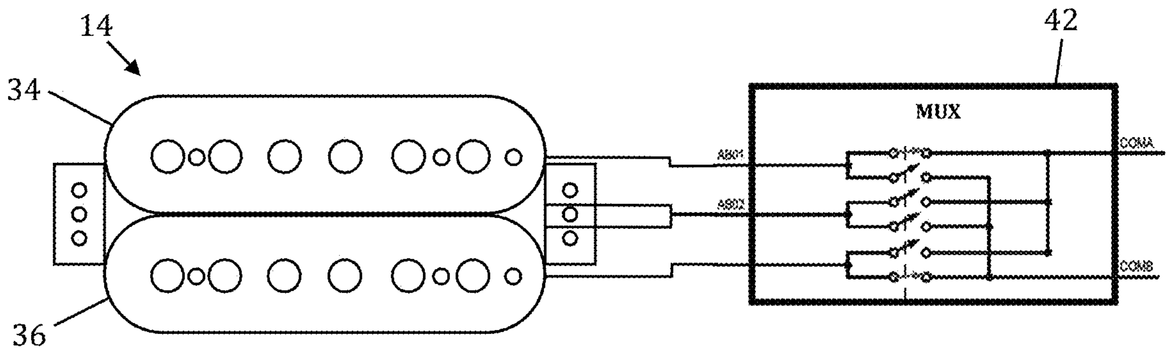
Figure 11:
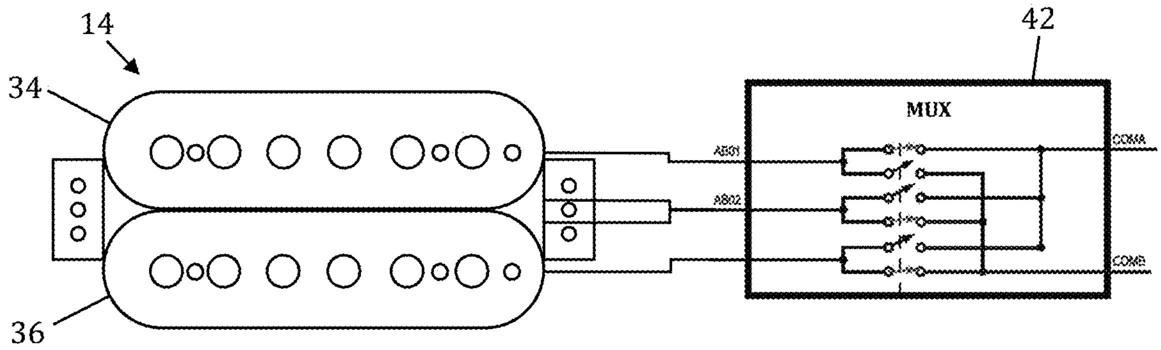
Figure 12:
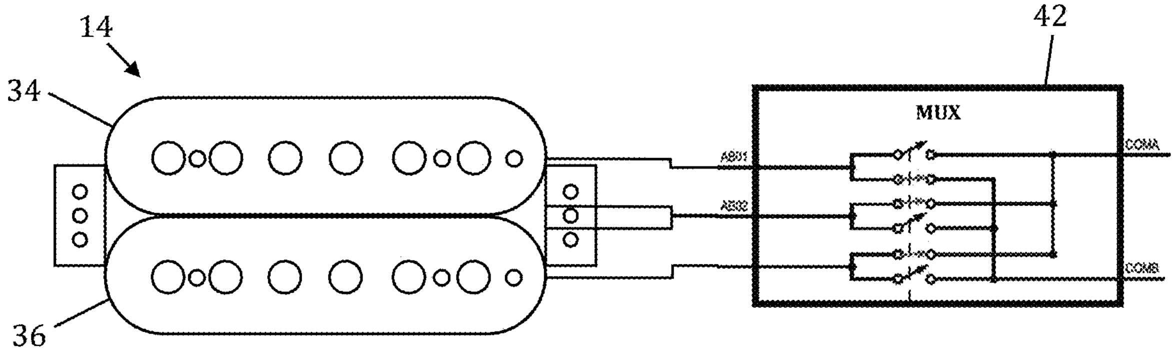
Figure 13:
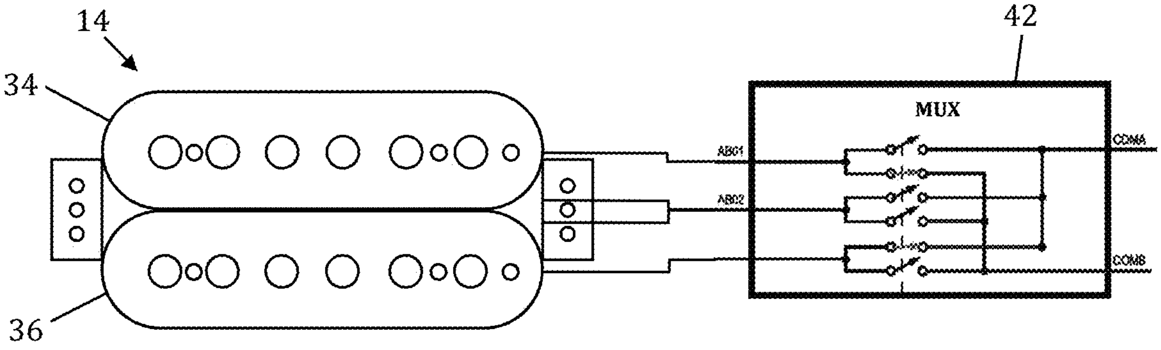
Figure 14:
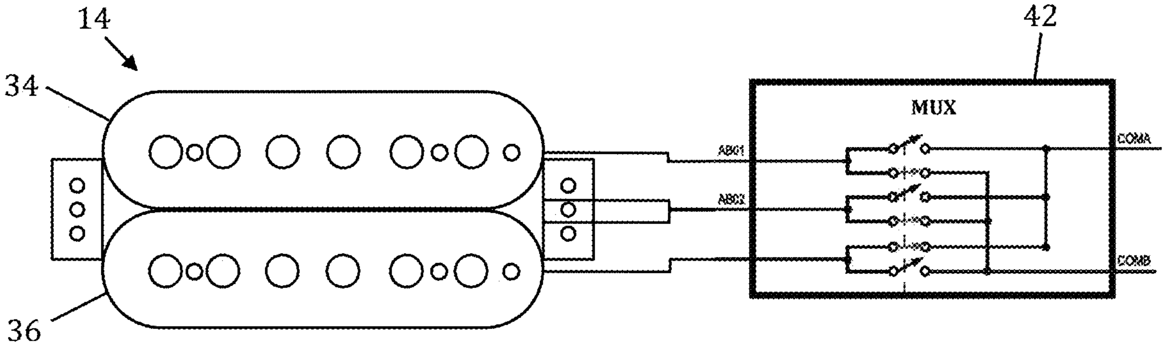
Figure 15:
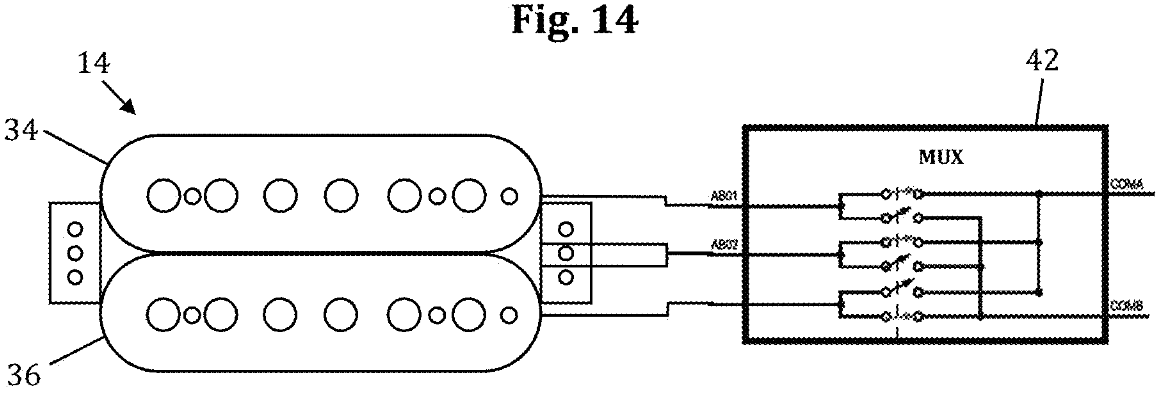
Figure 16:
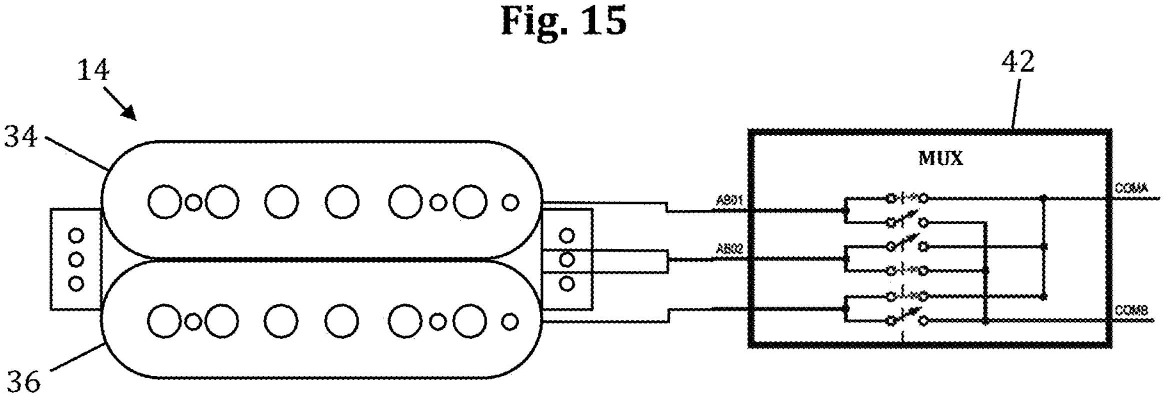
Figure 17:
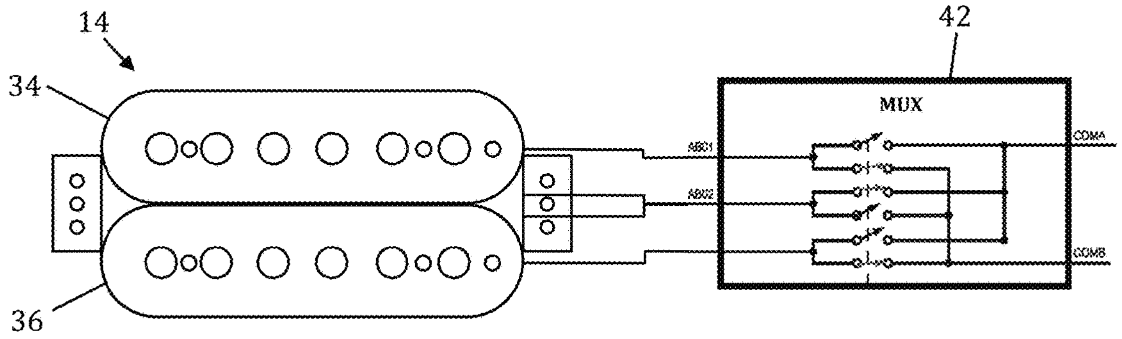

In some embodiments, a user may want to configure a humbucker pickup 14 having a first coil (or Coil 1) 34 off and a second coil (or Coil 2) 36 also off, as shown by way of example only in FIG. 9. In some embodiments, a user may want to configure a humbucker pickup 14 having a first coil 34 in phase and a second coil 36 also in phase, as shown by way of example only in FIG. 10. In some embodiments, a user may want to configure a humbucker pickup 14 having a first coil 34 in phase and a second coil 36 off, as shown by way of example only in FIG. 11. In some embodiments, a user may want to configure a humbucker pickup 14 having a first coil 34 out of phase and a second coil 36 off, as shown by way of example only in FIG. 12. In some embodiments, a user may want to configure a humbucker pickup 14 having a first coil 34 out of phase and a second coil 36 also out of phase, as shown by way of example only in FIG. 13. In some embodiments, a user may want to configure a humbucker pickup 14 having a first coil 34 off and a second coil 36 out of phase, as shown by way of example only in FIG. 14. In some embodiments, a user may want to configure a humbucker pickup 14 having a first coil 34 off and a second coil 36 in phase, as shown by way of example only in FIG. 15. In some embodiments, a user may want to configure a humbucker pickup 14 having a first coil 34 off and a second coil 36 out of phase, as shown by way of example only in FIG. 16 (illustrating a different configuration than that shown in FIG. 14). In some embodiments, a user may want to configure a humbucker pickup 14 having a first coil 34 out of phase and a second coil 36 in phase, as shown by way of example only in FIG. 17 (illustrating by way of example a parallel out-of-phase configuration which is the inverse of the configuration of FIG. 15).

Figure 18:
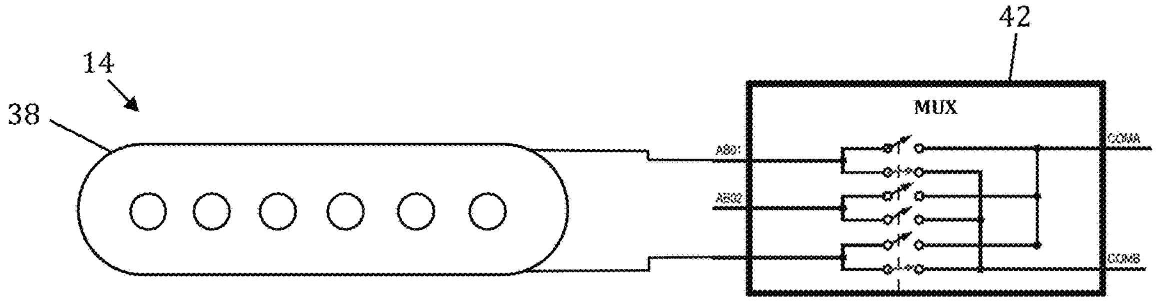
Figure 19:
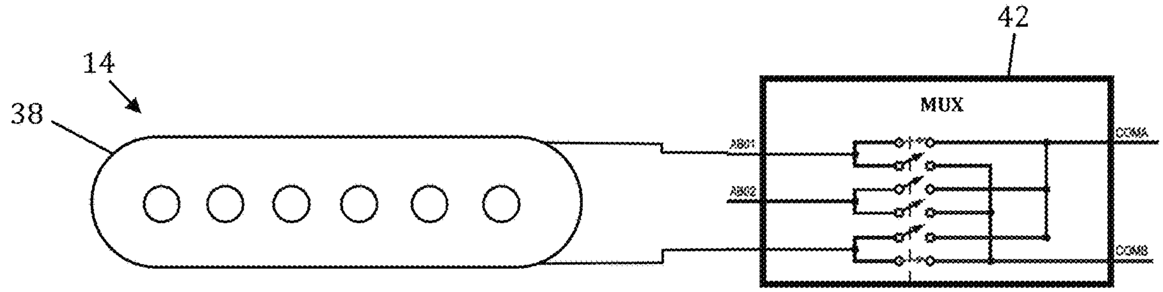
Figure 20:
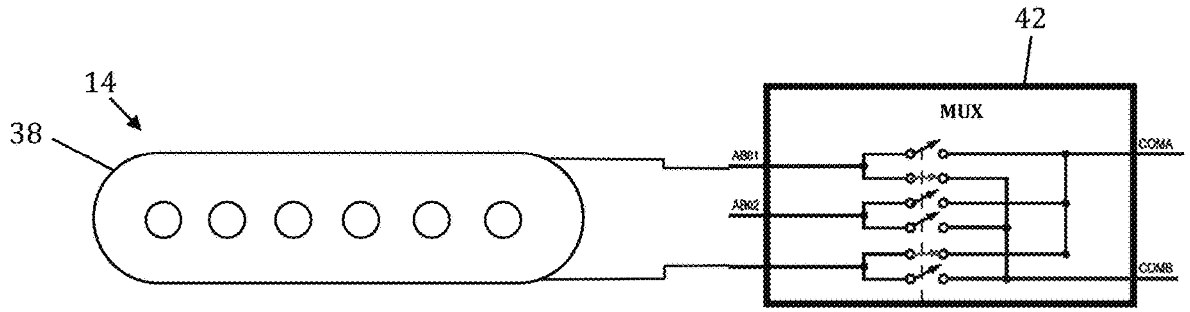

In some embodiments, a user may want to configure a single coil pickup 14 in which the single coil 38 is off, as shown by way of example only in FIG. 18. In some embodiments, a user may want to configure a single coil pickup 14 in which the single coil 38 is in phase, as shown by way of example only in FIG. 19. In some embodiments, a user may want to configure a single coil pickup 14 in which the single coil 38 is out of phase, as shown by way of example only in FIG. 20.

In arranging the pickups initially, the user need only decide what type of pickup he or she wants to place in which part of the instrument, and then hard wire the pickups to the switch device 12 (e.g. connecting to the terminal block 66) in an initial configuration. The user may operate the switch device 12 mechanically during performances to toggle between selected sounds, as is current practice. Subsequently, if the user wants to change the phase arrangements or other configurations of the pickups 14, instead of removing the cover from the instrument and physically changing the wiring of the pickups, the user need only to access the switch management app 18 on the computing device 16, and use the user interface 70 (See, e.g., FIG. 24) to select the desired tone phase arrangement (e.g., in phase, out of phase, or off) of each pickup 14, for example by tapping on the respective pickup configuration display icons 72 as described above. Upon user confirmation (e.g. by tapping on the "send" icon 76), the computing device 16 will wirelessly transmit instructions to the switch device 12, which will then make the necessary adjustments, for example by adjusting the pathways in the MUX 42.

In some embodiments, the processor 28 converts complex wiring parameters into selectable color-coded display icons presented on the UI 70 that are designed to be simple and easy. In some embodiments, each coil (e.g., the coil of a single coil pickup, and coils 1 and 2 of a humbucker pickup) may be represented by a display icon 72 that is color-coded to visually indicate to the user the phase setting of the represented coil in the selected coil setting. By way of example, a first color (e.g., black) may be displayed to indicate that a particular coil will be off if that particular setting is selected. A second color (e.g., blue) may be displayed to indicate that a particular coil will be in phase if that particular setting is selected. A third color (e.g., red) may be displayed to indicate that a particular coil will be out of phase if that particular setting is selected. A fourth color (e.g., green) may be displayed to indicate that the two coils of a humbucker have been connected in parallel mode.

Thus, in the coil configuration shown by way of example in FIG. 9, the display icon 72 representing the first coil 34 may be black to indicate that the first coil 34 is off, and the display icon 72 representing the second coil 34 may also be black to indicate that the second coil 36 is also off. In the coil configuration shown by way of example in FIG. 10, the display icon 72 representing the first coil 34 may be blue to indicate that the first coil 34 is in phase, and the display icon 72 representing the second coil 36 may also be blue to indicate that the second coil 36 is also in phase. In the coil configuration shown by way of example in FIG. 11, the display icon 72 representing the first coil 34 may be blue to indicate that the first coil 34 is in phase, and the display icon 72 representing the second coil 36 may be black to indicate that the second coil 36 is off. In the coil configuration shown by way of example in FIG. 12, the display icon 72 representing the first coil 34 may be red to indicate that the first coil 34 is out of phase, and the display icon 72 representing the second coil 36 may be black to indicate that the second coil 36 is off In the coil configuration shown by way of example in FIG. 13, the display icon 72 representing the first coil 34 may be red to indicate that the first coil 34 is out of phase, and the display icon 72 representing the second coil 36 may also be red to indicate that the second coil 36 is also out of phase. In the coil configuration shown by way of example in FIG. 14, the display icon 72 representing the first coil 34 may be black to indicate that the first coil 34 is off, and the display icon 72 representing the second coil 36 may be red to indicate that the second coil 36 is out of phase. In the coil configuration shown by way of example in FIG. 15, the display icon 72 representing the first coil 34 may be black to indicate that the first coil 34 is off, and the display icon 72 representing the second coil 36 may be blue to indicate that the second coil 36 is in phase. In the coil configuration shown by way of example in FIG. 16, the display icons 72 representing the first coil 34 and the second coil 36 may be green to indicate that the first and second coils 34, 36 are connected in parallel mode. In the coil configuration shown by way of example in FIG. 17, the display icon 72 representing the first coil 34 may be red to indicate that the first coil 34 is out of phase, and the display icon 72 representing the second coil 36 may be blue to indicate that the second coil 36 is in phase. In the coil configuration shown by way of example in FIG. 18, the display icon 72 representing the single coil 38 may be black to indicate that the single coil 38 is off. In the coil configuration shown by way of example in FIG. 19, the display icon 72 representing the single coil 38 may be blue to indicate that the single coil 38 is in phase. In the coil configuration shown by way of example in FIG. 20, the display icon 72 representing the single coil 38 may be red to indicate that the single coil 38 is out of phase.

Figure 21:
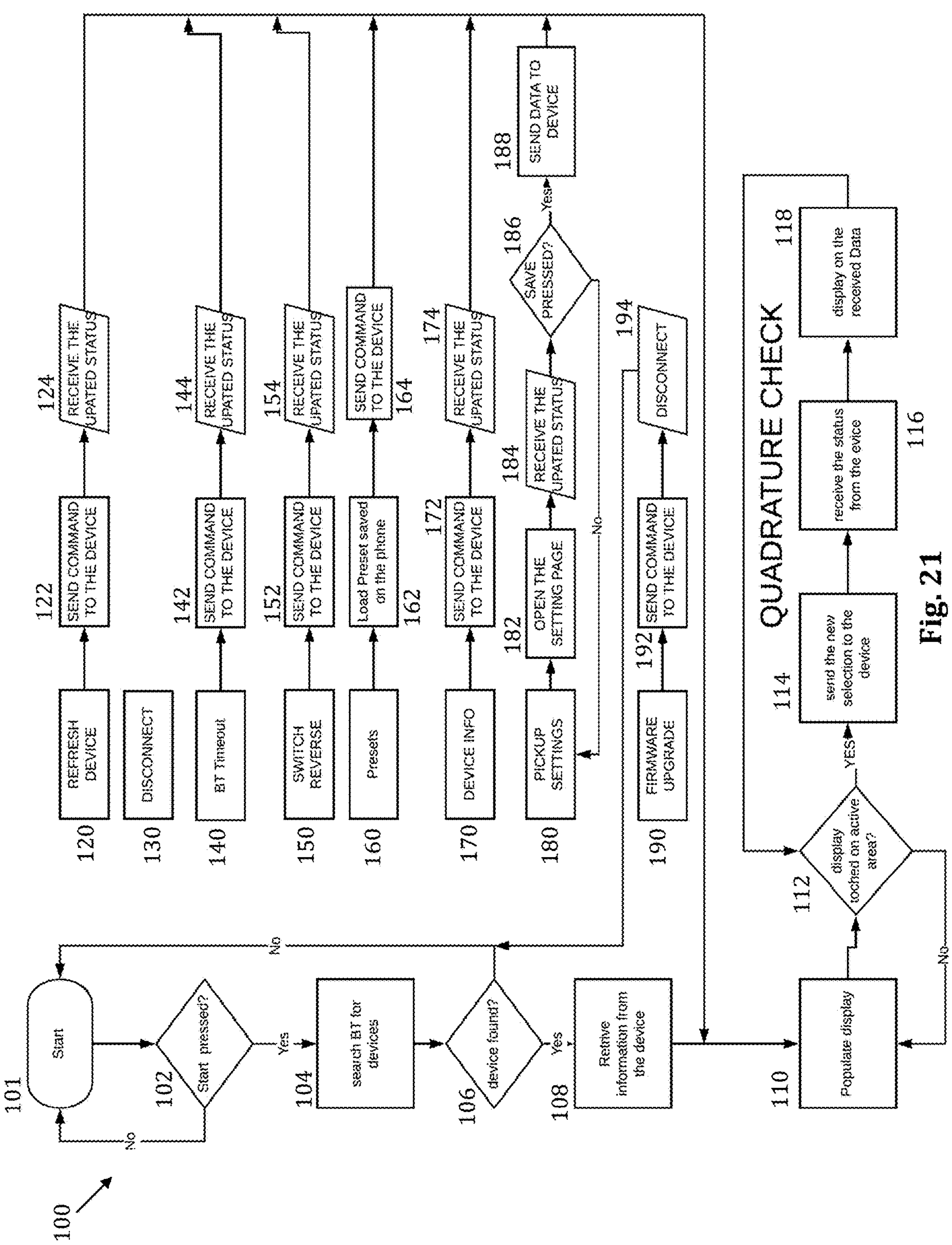
FIG. 21 is a flowchart illustrating an example switch management application protocol forming part of the wireless switching system of FIG. 1, according to some embodiments.

FIG. 21 is a flowchart illustrating an example protocol 100 that the interactive switch management app 18 may follow, according to some embodiments. It should be noted as an initial matter that reference herein to "computer" refers to the computing device 16 operating the interactive switch management app software 18, and actions or determinations performed by the "computer" may be interpreted as the processor 28 receiving and analyzing relevant data and proceeding based upon analysis of the received data. Similarly, reference to the switch device 12 sending and receiving information is to be interpreted as the processor 46 of the switch device 12 sending and receiving data or instructions by way of the wireless communication unit 52 of the switch device 12. Discussion herein of users pressing/tapping buttons (or icons) and being directed by the computer to different UI screens includes the computer determining that user input was received at a location that corresponds to a display of a particular user interface element (e.g., a "button" or an "icon") and in response, and sometimes without receipt of further user input, transitioning the display of the computer from a first user interface screen to a second user interface screen. Furthermore, although the pressing/tapping of buttons (or icons) indicates the presence of a touch screen interface, it is to be understood that certain computers that may operate the application software of the present disclosure may not be equipped with a touch screen interface and therefore the pressing of buttons may be achieved by another suitable way, such as using a mouse to direct a pointer to the correct spot on the screen and then "clicking" the mouse button. In response to the user input, the computer 16 then performs additional actions, for example switching UI screens, communicating with a host server, etc.

Figure 23:
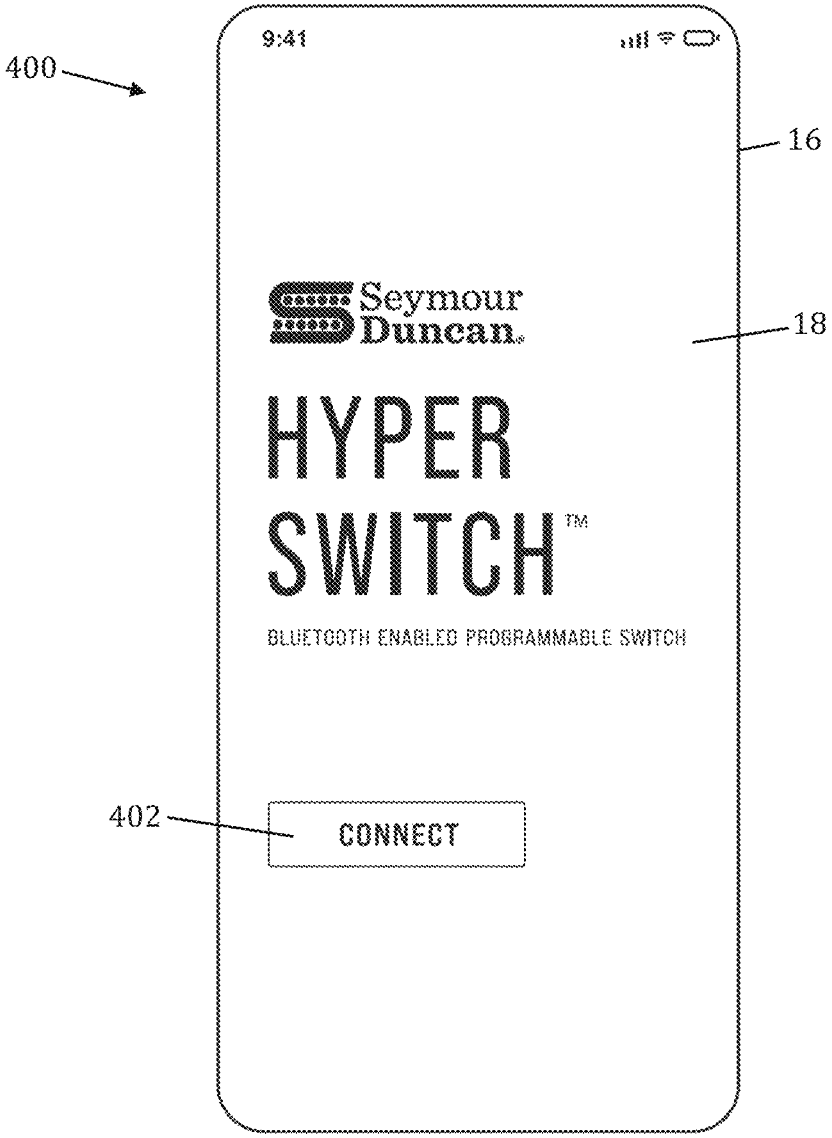
FIGS. 23-28 are plan views of various user interface screens forming part of the switch management software application forming part of the wireless switching system of FIG. 1.

In some embodiments, the first oval 101 of the example protocol 100 may represent an initial UI screen that the computer presents to the user in response to the user opening the app 18 on the user's computing device 16 (e.g. the home screen 404 of FIG. 23). By way of example, this initial UI screen may include a "Start" button or icon (or equivalent feature such as the "Connect" icon/button 402 of FIG. 23) that the user may press or tap to instruct the computer to start running the interactive switch management app 18. At the next step 102 of the protocol 100, the computer may determine if the user pressed or tapped the start button/icon. If the computer determines that the answer is "no," then the protocol reverts to the previous step 101 of presenting (or continuing to display) a start icon or button. If the answer is determined to be "yes", then per box 104 the computer 16 may search for a nearby switch device 12 (e.g. preferably one that is mounted on a stringed instrument), for example using Bluetooth or any other data communication standards described herein. At box 106 of the protocol, the computer may determine if a nearby switch device 12 is found, and if the answer is "no" then the protocol 100 returns to the "Start" screen at box 101. If the computer does find a nearby switch device 12, then the computer 16 seeks to establish wired or wireless communication with the switch device 12 (e.g. using Bluetooth or any other data communication standards described herein), and retrieve information from the switch device 12, per protocol box 108. In some embodiments, this retrieved information may include (but not be limited to) user presets, saved and/or last pickup settings, usage type or duration, information pertaining to the stringed instrument, and the like.

Figure 24:
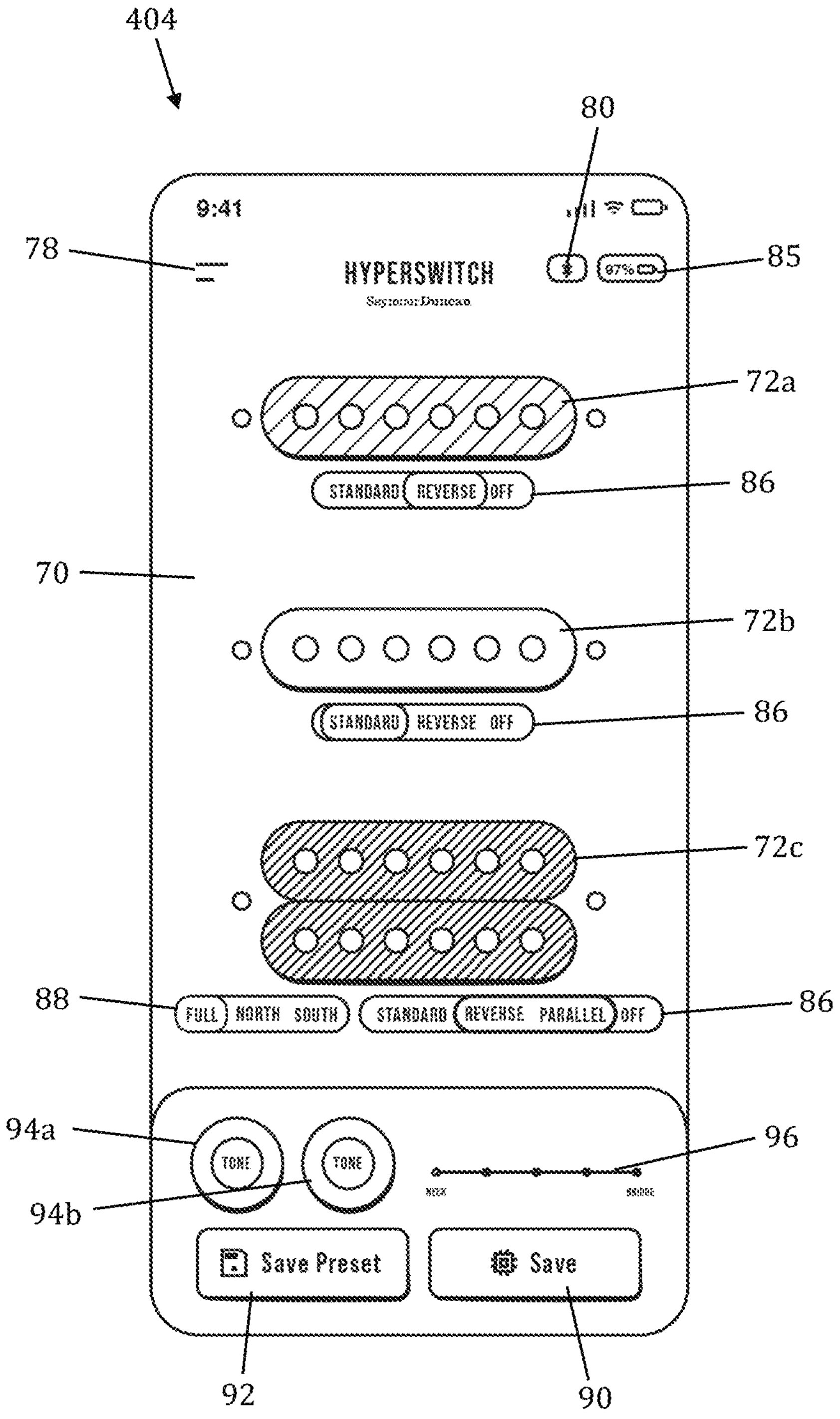

In some embodiments, once the computer or computing device 16 has received the data from the switch device 12, the computer 16 may populate the UI 70 (Protocol box 110) with the relevant information (see, e.g., the home screen 404 of FIG. 24). According to the next step 112 of the protocol 100, the computer 16 may determine if a user has touched the display 24 in an active area (e.g., for touch screen embodiments, or by directing a selection icon via a mouse, trackpad, or key strokes, for example) to change the pickup configuration or sound output. If computer 16 determines the answer to be "no", then the protocol 100 returns to box/step 110, in which the display remains populated with the information retrieved in the previous step 108. If the computer 16 determines the answer to be "yes", then (per box 114) the computer 16 will send instructions for implementation of the new selection to the switch device 12, and perform a quadrature check, in which the computer 16 (after implementation of the new selection by the switch device 12) receives new status data from the switch device 12 (box 116) and then displays the received status data on the display unit 24 of the computing device 16 (box 118), confirming to the user that the user's selection has been implemented.

The above-described protocol 100 represents an example set of instructions embodied in the interactive switch management app 18 that the computing device 16 implements to connect with a switch device 12, recognize the current settings of the switch device 12, receive user inputs for changes to the current settings of the switch device 12, communicate the user's instructions to the switch device 12, and confirm that the communicated instructions were implemented by the switch device 12. Some examples of user selections or automatic processes that may be included in the protocol 100 are Refresh Device 120, Disconnect 130, Bluetooth Timeout 140, Switch Reverse 150, Presets 160, Device Info 170, Pickup Settings 180, and Firmware Upgrade 190. By way of example, in nearly each case, the protocol 100 includes a quadrature check sequence.

For example, in some embodiments, the user may select a Refresh Device 120 option (e.g. by tapping on an activated area of a touch screen interface or by selecting the option using a mouse, trackpad, etc.). In response, the computer 16 sends instruction to the switch device 12 (box 122). After implementation of these instructions, the switch device 12 sends, and the computing device 16 receives, status change data confirming that the change requested by the user has been implemented (box 124). At this point, the computer 16 follows the protocol 100 to box 110 and populates the display 24 with the new selection (e.g. by reloading the home screen 404 or start screen 400).

In some embodiments, the user may choose a Disconnect 130 selection to disconnect the computing device 16 from the previously connected switch device 12. In this case, the computer 16 may break the connection without requiring confirmation from the switch device 12.

In some embodiments, the interactive switch management app 18 may perform an automatic Bluetooth (or other wireless connection) timeout 140, for example upon expiration of a preset period of time (e.g., 30 seconds, however any duration of time may be programmed as the timeout period) during which there is no data communication between the computing device 16 and the switch device 12. Once the preset period time has expired, the computer 16 sends instruction to the switch device 12 (box 142) to sever the wireless communication (e.g. Bluetooth) connection. After implementation of these instructions, the switch device 12 sends, and the computing device 16 receives, status change data confirming that the connection is ending (box 144). At this point, the computer 16 follows the protocol 100 to box 110 and populates the display 28 with the new status (e.g. by indicating on the home screen 404 or start screen 400 that the Bluetooth has timed out and is no longer connected).

In some embodiments, the user may select a Switch Reverse 150 option (e.g. by tapping on an activated area of a touch screen interface or by selecting the option using a mouse, trackpad, etc.), to change the assignment of pickup locations for the switch device 12. By way of example, selecting this option for a five-way switch device 12 installed on a guitar having neck, middle, and bridge pickups reverses the assignment of said pickups, for example where a particular guitar design requires that the five-way switch installation be physically reversed. In response the computer 16 sends instruction to the switch device 12 (box 152). After implementation of these instructions, the switch device 12 sends, and the computing device 16 receives, status change data confirming that the change requested by the user has been implemented (box 154). At this point, the computer 16 follows the protocol 100 to box 110 and populates the display 28 with the new selection (e.g. by reloading the home screen 404 or start screen 400).

In some embodiments, the user may select a Presets option 160 (e.g. by tapping on an activated area of a touch screen interface or by selecting the option using a mouse, trackpad, etc.), to load a preset pickup configuration stored in the memory 30 of the computing device 16. In response, the computer 16 first retrieves the selected preset configuration and loads it into the app 18 (box 162). Then the computer 16 sends instruction to the switch device 12 to load the selected preset configuration selected by the user (box 164). After implementation of these instructions, the switch device 12 sends, and the computing device 16 receives, status change data confirming that the change requested by the user has been implemented (box 124). At this point, the computer 16 follows the protocol 100 to box 110 and populates the display 28 with the new selection (e.g. by reloading the home screen 404 or start screen 400).

In some embodiments, the user may select a Device Info 170 option (e.g. by tapping on an activated area of a touch screen interface or by selecting the option using a mouse, trackpad, etc.). In response the computer 16 sends instruction to the switch device 12 (box 172) to check and display the device info. After implementation of these instructions, the switch device 12 sends, and the computing device 16 receives, status change data confirming that the change requested by the user has been implemented (box 174), namely, to retrieve and present information pertaining to the switch device 12 and/or stringed instrument that the switch device 12 is mounted to. At this point, the computer 16 follows the protocol 100 to box 110 and populates the display 24 with the new selection (e.g. by reloading the home screen 404 or start screen 400).

In some embodiments, the user may select a Pickup Settings 180 option (e.g. by tapping on an activated area of a touch screen interface or by selecting the option using a mouse, trackpad, etc.), for example to change the active pickup settings on their stringed instrument. In response, the computer 16 causes the Settings page to be displayed on the display device 24 (box 182) and receives the input from the user regarding the new configuration (box 184). Next, the computer 16 may determine whether the user pressed or tapped the Save icon (box 186). If No, then the computer 16 resets to the beginning of the Pickup Settings option (box 180). If Yes, then the computer 16 sends the saved pickup configuration to the switch device 12 (box 188) for implementation. At this point, the computer 16 follows the protocol 100 to box 110 and populates the display 24 with the new selection (e.g. by reloading the home screen 404 so that it displays the new pickup configuration).

In some embodiments, the user may select a Firmware Upgrade 190 option (e.g. by tapping on an activated area of a touch screen interface or by selecting the option using a mouse, trackpad, etc.), or the app 18 may check the app store for available updates, and then upgrade automatically when appropriate. In response the computer 16 sends instruction to the switch device 12 (box 192) that an upgrade is in progress. Once the update is completed, the computer may disconnect from the device (box 194), and reset the app protocol 100 to begin at the start screen (box 101).

Figure 22A:
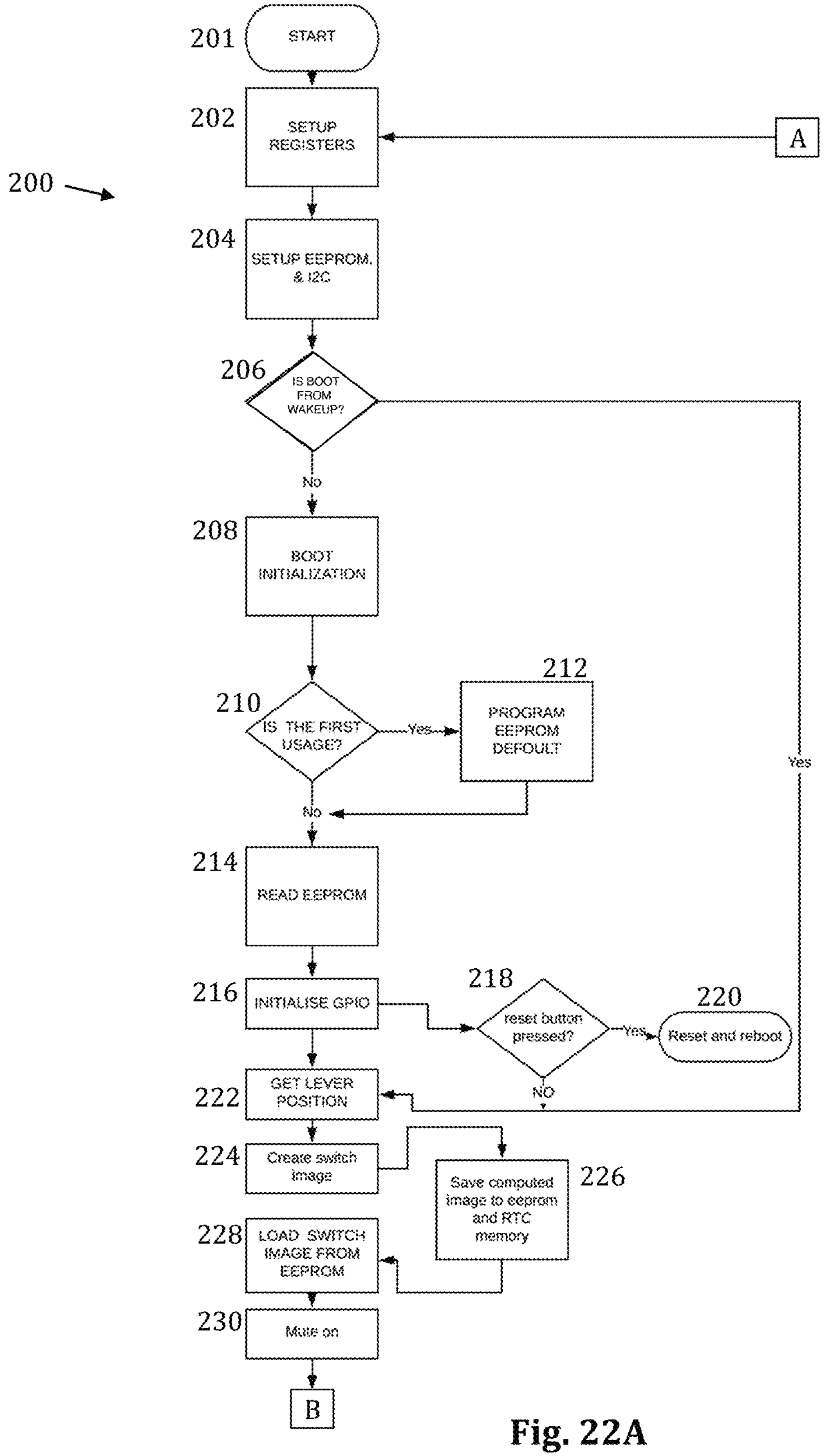
FIGS. 22A-22C illustrate different portions of a flowchart depicting an example firmware protocol forming part of the wireless switching system of FIG. 1, according to some embodiments.
Figure 22B:
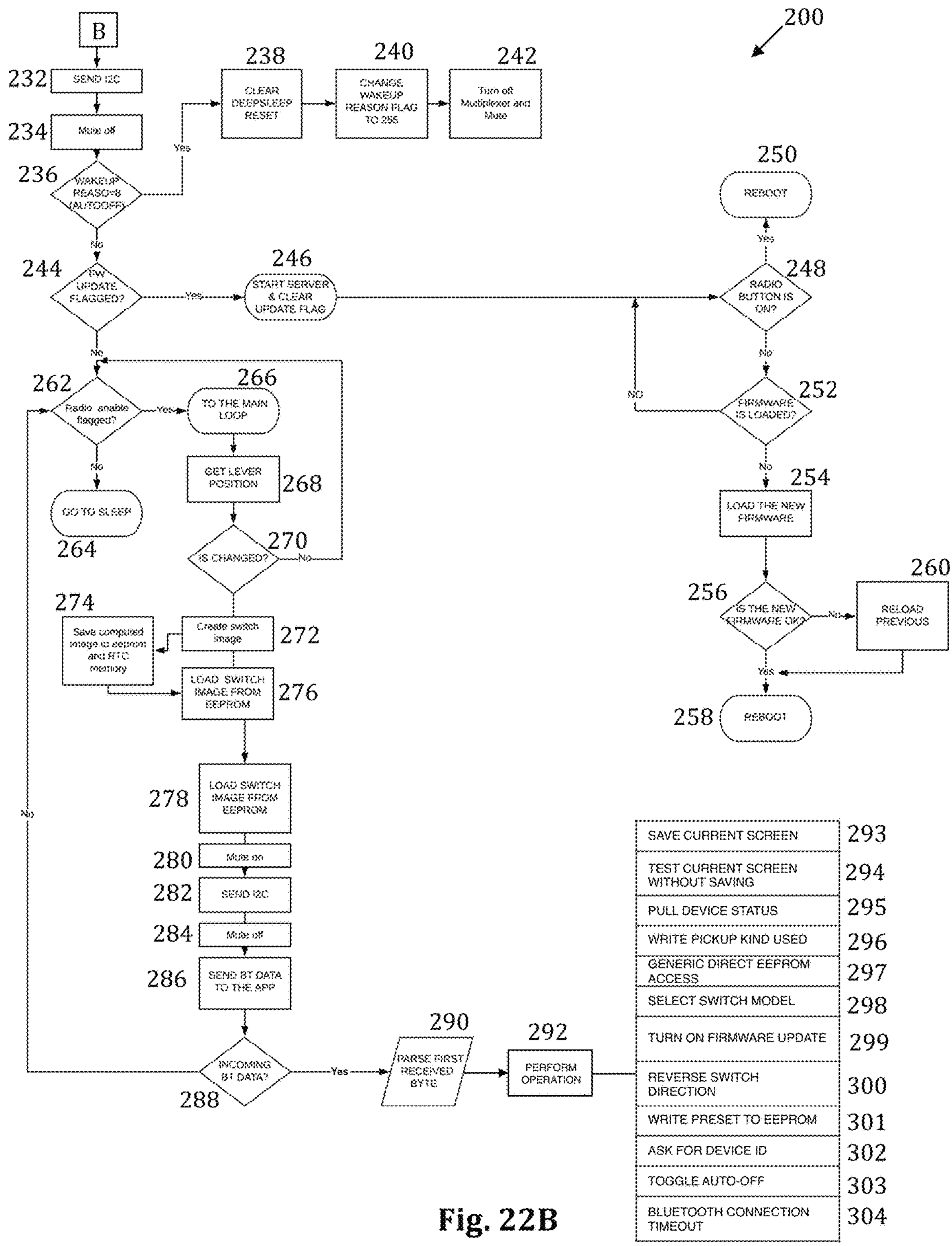
Figure 22C:
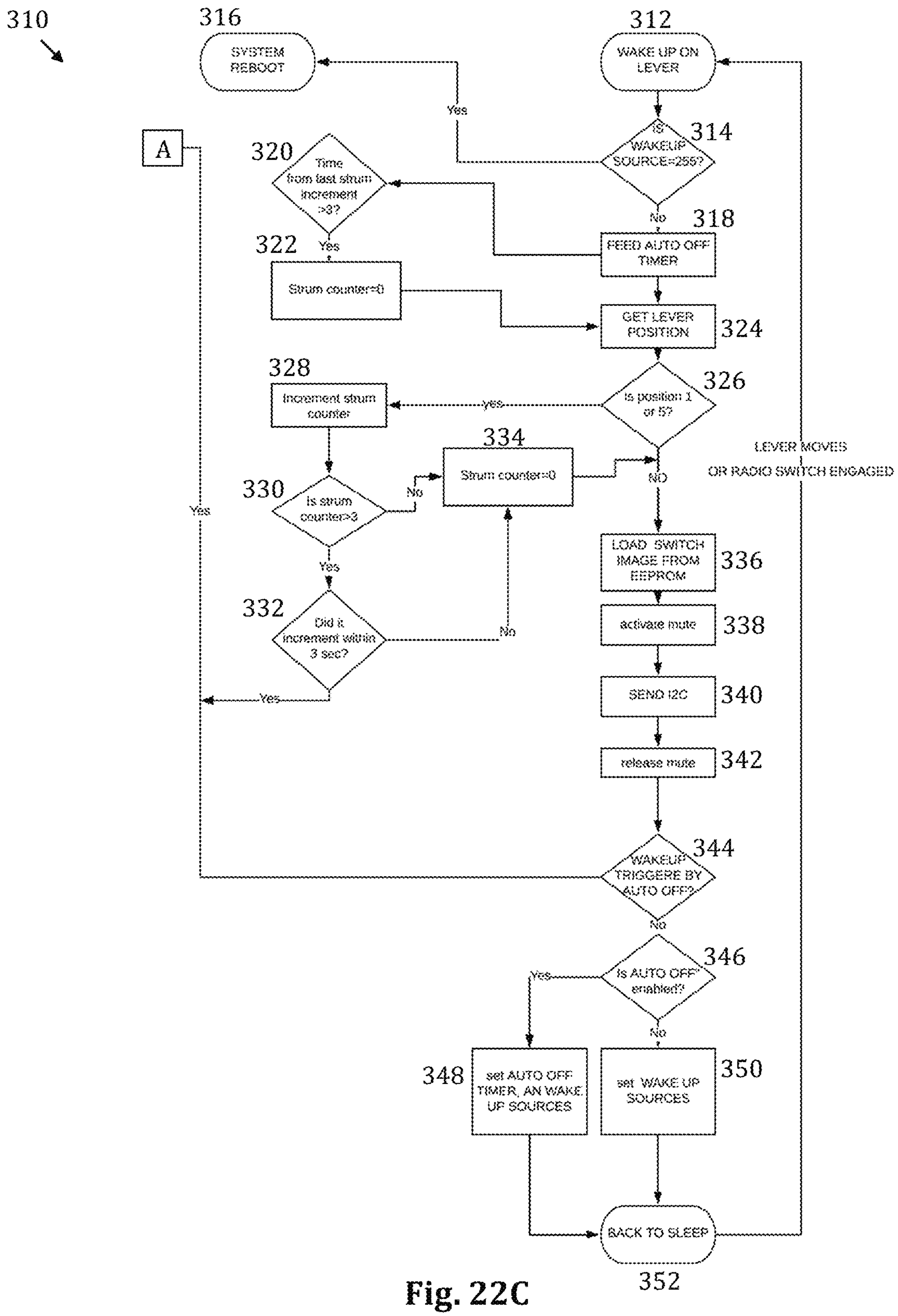

FIGS. 22A-22C illustrate different portions of a flowchart depicting an example firmware protocol (e.g. instructions) 200 that the processor 46 of the switch device 12 follows to receive and implement instructions transmitted from the computing device 16 by way of user interaction with the app 18, according to some embodiments. In particular, FIGS. 22A-22B illustrate an example protocol 200 that the firmware follows from initial boot up to ultimately configure the coil settings of the various pickups as selected by the user by way of the switch management app 18 on the computing device 16.

As shown in FIG. 22A, the firmware protocol 200 starts at box 201 with the initial boot up or start. By way of example only, the first steps of the firmware protocol 200 that the processor 46 executes is setup registers (box 202) and setup memory 48 (e.g., EEPROM or similar) and the serial communication bus protocol (e.g. Inter-Integrated Circuit or I2C)(box 204). At this point (box 206), the processor 46 determines whether the boot was from wakeup. If the answer is no, the protocol proceeds with boot initialization (box 208) and then the processor 46 determines if this is the first usage of the device (box 210). If yes, the processor 46 then loads a default program from the memory 48, and then proceeds to the next step of the protocol (box 214), which is to read the memory 48. If it is not a first usage, then the protocol would proceed from box 210 directly to box 214, wherein the processor 46 reads the memory 48, for example which may include the last pickup configuration that the user employed. At this point, the processor 46 initializes the general purpose I/O (GPIO) 50 (box 216) and determines whether the reset button has been pressed (box 218). If the reset button has been pressed, the protocol advances to box 220 and the processor 46 directs a reset and reboot of the Firmware, returning the protocol to the start (box 201). If the reset button has not been pressed, then the protocol advances to box 222, If the reset button has not been pressed, or alternatively if the answer to the query of whether the boot was from wakeup was no (box 206), then the processor 46 proceeds to determine the lever 44 position (box 222), create a switch image (box 224), save the computed image to both the memory 48 (e.g. EEPROM) and real-time clock (RTC) memory (box 226) so that the switch image is accessible even if the processor 46 is on standby. The processor then loads the switch image from the memory 48 (box 228) and activates a muting feature (box 230) to eliminate any pops and clicks during the switching period, making switching totally silent. After muting has been activated, (following path B from FIG. 22A to FIG. 22B), the processor 46 then sends I2C instruction (box 232) to change the open pathways through the MUX 42 to implement the pickup configuration embodied in the loaded switch image for the current lever 44 position. After the switch has concluded, the processor 46 turns the muting feature off (box 234).

Once the initial pickup configuration or switch image has been implemented, the processor 46 determines whether the wakeup was triggered by the Auto Off function (box 236). If the answer is yes, then the processor 46 proceeds to clear the deep sleep reset (box 238), change the wakeup reason to flag 255 (box 240), turn off the MUX and mute (box 242), and then may reboot the system.

If the answer is no, then the processor 46 determines whether a firmware update is flagged (box 244). If the answer is yes, then the processor 46 starts the update server and clears the update flag (box 246), and then determines if the radio button (or wireless communications module 52) is on (box 248), to enable wireless communication. If the radio button is on, then the processor will cause the system to reboot (box 250) and the process begins anew. If the radio is not on, then the processor will determine whether the firmware update has been downloaded (box 252). If the answer is no, then the protocol reverts to box 248 to check that the radio is on. If the answer is yes, then the processor 46 proceeds to load the new firmware (box 254) and then performs a check to ensure the new firmware is good (box 256). If the new firmware is determined to be good, then the processor 46 proceeds to reboot the system (box 258). If the new firmware is determined to be not good, then the processor will reload the previous firmware (box 260) and reboot (box 258).

If the answer to the query of box 244 (e.g. is a firmware update flagged) is no, then the processor 46 determines whether the communications module 52 (or radio) is on (box 262). If the radio is not on, then the processor 46 forces the switch device 12 back to sleep (box 264). If the radio is on, then the processor 46 advances the protocol 200 to the main active query loop (box 266), and then proceeds to determine the lever position (box 268). Next, the processor 46 will determine whether the newly determined lever position has changed since the last determination (box 270). If the lever position has not changed, then the processor 46 again ascertains whether the radio is on (box 262) in an attempt to force the switch device 12 to sleep. If the lever position has changed since the last determination, then the processor 46 create a switch image (box 272), save the computed image to both the memory 48 (e.g. EEPROM) and real-time clock (RTC) memory (box 274) so that the switch image is accessible even if the processor 46 is on standby. The processor then loads the switch image from the memory 48 (box 276) and activates a muting feature (box 280) to eliminate any pops and clicks during the switching period, making switching totally silent. After muting has been activated, the processor 46 then sends I2C instruction (box 282) to change the open pathways through the MUX 42 to implement the pickup configuration embodied in the loaded switch image for the current lever 44 position. After the switch has concluded, the processor 46 turns the muting feature off (box 284).

Next, the processor 46 sends data to the computing device 16 via the wireless communications module 52 (e.g. via Bluetooth) to confirm that the desired switch has been made (box 286). The processor 46 then checks for incoming data from the computing device 16 (box 288). If there is no more incoming data, then the processor 46 again ascertains whether the radio is on (box 262) in an attempt to force the switch device 12 to sleep in order to conserve power.

If the answer to the query of box 288 is yes and there is more data being sent wirelessly from the computing device 16, then the processor 46 parses the data to determine the specific instructions sent (box 290), and then proceeds to implement the instructions received from the computing device 16 (box 292). For example, the instructions to be implemented may include but not be limited to saving the current pickup configuration (box 293), testing the current pickup configuration without saving (box 294), communicate the status of the switch device 12 (box 295), write the pickup kind used (box 296), provide generic memory 48 (e.g. EEPROM) access (box 297), select or indicate a switch model (box 298), turn on the firmware update (box 299), reverse the switch direction (box 300), save or write a pickup configuration as a preset configuration to the memory 48 (box 301), request the switch device 12 identification (box 302), toggle the auto-off feature (box 303), and/or determine the occurrence of a wireless connection timeout event (box 304), which would ultimately cause the processor 46 to return the device to sleep. By way of example only, each of the instructions, when implemented, may cause the processor 46 to revert the protocol 200 to various relevant points in the main loop (e.g., box 266 and thereafter).

FIG. 22C illustrates an example of a sleep routine or protocol 310 that the wireless switch mechanism follows to conserve power when not in use. In some embodiments, the switching system 10 of the present disclosure uses advanced power handling techniques to reduce the power consumption. Power is a necessary and important component of a wireless switching system. Traditionally, the existing switching systems are passive arrays of contacts mechanically actuated and require no power. The wireless switching system 10 of the present disclosure includes firmware protocol designed to keep the processor always sleeping, using low level programming approach. To achieve this result, a wakeup protocol is executed before the operating system boots up, and then the CPU is forced back to sleep when the user is finished.

By way of example only, the example sleep protocol 310 provided herein begins upon movement of the lever 44, which causes the processor 46 of the switch device 12 to "wake up" (box 312). The first thing the processor 46 does is to determine whether the wakeup source=255 (box 314), which if yes requires a system reboot (box 316). If no, then the processor 46 feeds the auto off timer (box 318) and determines the time from the last strum increment (box 320). If the time from the last strum increment is greater than 3 seconds, then the processor sets the strum counter to 0 (box 322) and determines the lever position (box 324). If the lever position is determined to be in one of the end positions of the multi-position switch 12 (e.g., position 1 or 5 of a 5-way switch as described by way of example only herein throughout) (box 326), then the processor 46 will activate the increment strum counter (box 328). If the strum counter is greater than 3 (box 330), then the processor 46 will determine if the strum counter incremented within the last 3 seconds (box 332). If the time from the last strum increment is less than 3 seconds, then the protocol proceeds to the system bootup protocol by setting up registers (box 202, FIG. 22A). By way of example, if the strum counter is less than 3 (box 330), or the increment from the last strum occurrence is greater than 3 seconds (for example)(box 332), then the processor 46 sets the strum counter to 0.

By way of example, if the lever position is determined to be in a non-end position of the multi-position switch 12 (e.g., positions 2, 3, or 4 of a 5-way switch)(box 326), or if the lever position is in an end position and after the strum counter has been set to 0 (box 332), the processor 46 loads the switch image corresponding to the lever position from the memory 48 (box 336) and activates a muting feature (box 338) to eliminate any pops and clicks during the switching period, making switching totally silent. After muting has been activated, the processor 46 then sends I2C instruction (box 340) to change the open pathways through the MUX 42 to implement the pickup configuration embodied in the loaded switch image for the current lever 44 position. After the switch has concluded, the processor 46 turns the muting feature off (box 342).

By way of example, after the pickup configuration has been set, the processor determines whether the wakeup was triggered by the Auto Off function (box 344, FIG. 22*c*). If yes, then the protocol 310 proceeds to the system bootup protocol by setting up registers (box 202, FIG. 22A). If no, then the processor 46 determines whether the Auto Off function is enabled (box 346). If yes, then the processor 46 sets an Auto Off timer and Wake Up sources (box 348), and then puts the switch device 12 back to sleep (box 352). If no, then the processor sets the Wake Up sources (box 350), and then puts the switch device 12 back to sleep (box 352).

In some embodiments, wiping the lever 44 back and forth through two or more cycles may activate the wireless communication module (e.g., turn on the Bluetooth radio, for example). If nothing else happens in a set period of time (e.g., 30 seconds), for example if the user somehow accidentally activated this feature, then the wireless communication module will turn off the communication radio to conserve power. This feature is advantageous in that it reduces the number of parts and materials to be placed into the instrument cavity, thereby reducing bulky wiring issues and also reduces the costs associated with the system.

FIGS. 23-28 illustrate various graphic user interface (GUI) screens that the computing device 16 (or "computer") may present and that a user may encounter while using the interactive switch management app 18. The setup process generally occurs after a user has installed the desired pickups in the desired locations on their stringed instrument and connected the pickups to a switch device 12 of the present disclosure. The setup begins with a user logging into the app 18 located on a portable computing device 16 (e.g. tablet computer or smart phone) preferably having a touch-screen interface or laptop computer. FIG. 23 illustrates an example of an initial screen 400 that verifies the name of the program and includes a "Connect" button or icon 402, that the user may activate by tapping (e.g. on a touch-screen interface) or clicking on (e.g. on a non-touch-screen interface) which prompts the computer 16 to attempt to connect with the switch device 12 and present registered, logged in users with the home screen 404, described below.

By way of example, the computer may present a first-time user with a signup screen, where the user may create an account using one of email, phone number, Google ID, Facebook ID, or Apple ID, and by choosing a password. Upon entering these credentials, the computer may present the user with a set of Terms & Conditions, which the user must agree to before their account is activated. Once the user agrees to the Terms & Conditions, the computer may present the user with a password verification screen, in which the user enters their chosen password. If the entered password matches the registered password, then the computer advances the user to the next screen, which may be an optional Profile Completion screen. By way of example only, in this screen the user may be able to enter their name and attach a photo, among other things. Once the user has completed the profile (or skipped the opportunity), the computer may prompt the user to wirelessly connect their switch device 12, for example using Bluetooth or similar wireless data transfer technology.

By way of example, a registered but logged out user may be presented with a login screen, which may include a name field for the user to input their name, username, email address, Facebook ID, Google ID, or Apple ID, and a password field for the user to input their password to gain access to the software. The computer verifies the authentication data against a list of registered users and if the authentication data matches, the computer advances the user to the next screen.

Once the user has successfully created an account and/or logged into the interactive switch management app 18, he or she is directed to the home screen 404 (e.g. FIG. 24), which the computing device 16 presents in response to determining that correct authentication data was entered. As with the example described above in reference to FIG. 1, the user interface 70 may comprise a touch-screen interface, and the display icons may be selectable by the user to enable the user to communicate instructions to the app 18 by selecting or tapping on the display icon. For example, the computing device 16 may display pickup configuration icons 72 (or 72*a*, 72*b*, 72*c*) that may be color-coded to indicate pickup configuration (e.g., standard, reverse, or off for single coil pickups and standard, reverse, parallel, or off for humbucker pickups), as well as including a status indicator bar 86 that displays the status of the pickup shown (e.g., standard, reverse, or off for single coil pickups and standard, reverse, parallel, or off for humbucker pickups) positioned next to the pickup configuration icons 72*a*-72*c* to provide additional indication of pickup configuration. In some embodiments, humbucker pickup icons (e.g. 72*c* in the example shown) may have an additional status indicator bar 88 that indicates polarity (e.g., full, north, or south).

By way of example, if the user wants to change the configuration of one or more pickups 14 (e.g. to change the sound produced by the stringed instrument) for any lever position, the user may select or tap the corresponding pickup configuration icon 72*a*, 72*b*, 72*c*, which by way of example only causes a the computer 16 to shift the pickup configuration to the next configuration on the right on the status indicator bar 86. For example, tapping on pickup icon 72*b* would cause the computer 16 to change the corresponding pickup indicator 86 from "standard" to "reverse" since "reverse" is one step to the right of "standard". Tapping on the pickup icon 72*b* a second time (or twice in succession) causes the computer 16 to change the pickup configuration to "off", and so forth. In some embodiments, pressing and holding one's finger on the tappable icon causes the computer 16 to display a pickup menu 406 with the configuration options (e.g. standard, reverse, parallel, off) for that particular pickup at the selected lever position (See, e.g. FIGS. 25-27 for example pickup menus 406*a*-406*c* that correspond to the example home screen 404 shown in FIG. 24). The user may then select a desired configuration by tapping on the desired option. This process may be repeated to change the configuration of multiple pickups 14 at each lever position. When the user has finished making the selections, the user may tap on a "save" icon 90 (for example) to cause the computer 16 to wirelessly transmit (e.g., by way of the wireless communications unit 26) the switching instructions to the mounted switch device 12, which then implements the instructions by switching the pickup coil configuration on the stringed instrument as indicated, by changing the electrical pathway through the multiplexer 42. In some embodiments, the user may elect to save a particular pickup configuration at a particular lever position as a preset configuration that the user can quickly select at a later date. To accomplish this, the user may tap in on a "Save Preset" icon 92, which in some embodiments may cause the computer 16 to present the user with a popup window (or similar) giving the user an opportunity to assign a name to the preset configuration before saving. In some embodiments, the saved preset configuration comprises a set of pickup configurations for each lever position of the multi-position switch device 12, and tapping on the "Save Preset" icon 92 may cause the computer 16 to present the user with a popup window (or similar) giving the user an opportunity to update an existing preset configuration (e.g. by selecting the pickup configuration from a list of saved presets) or to create a new saved preset configuration.

Figure 28:
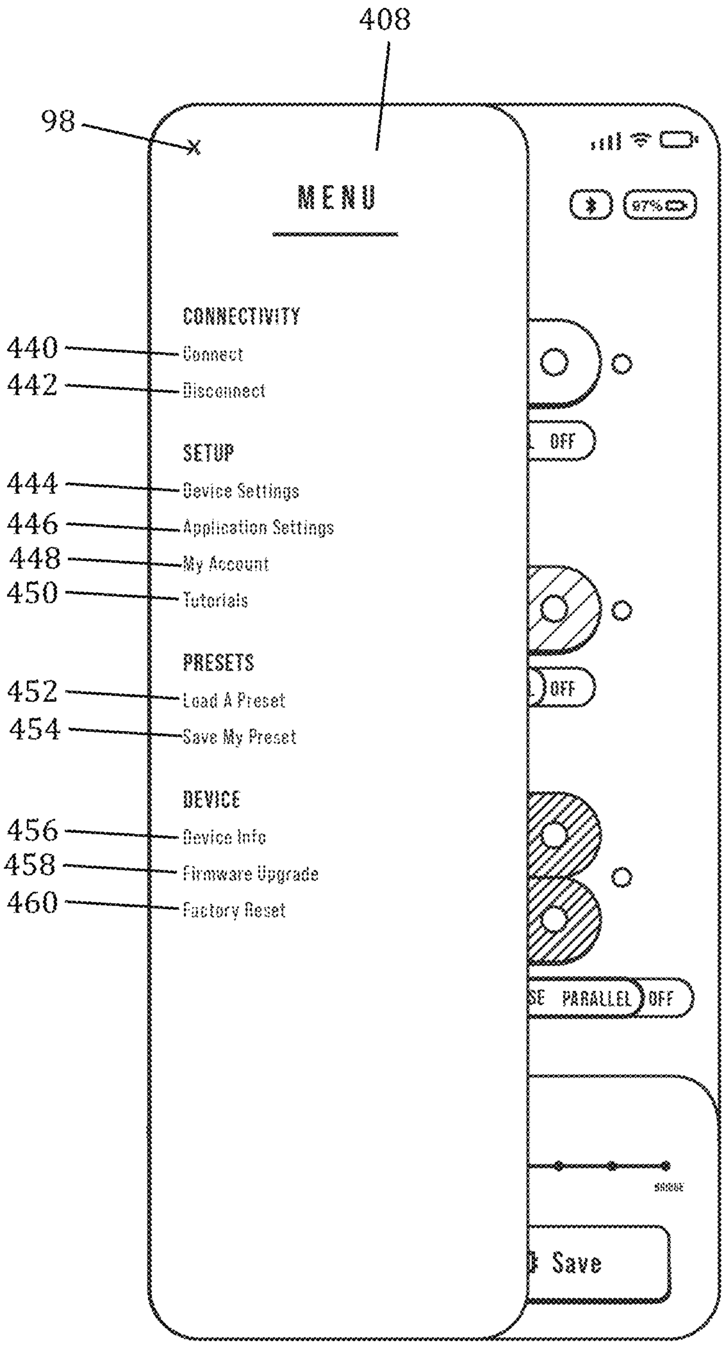

By way of example only, the computer may display additional display icons (which may be interactive) on the user interface 70, including but not limited to a menu icon 78, which when tapped or otherwise activated by a user causes the computer to present the user with a popup menu, as shown for example in FIG. 28 (which may include selections such as "Connect", "Disconnect", "Device Settings", "Application Settings", "My Account", "Tutorials", "Load a Preset", "Save My Preset", "Device Info", "Firmware Upgrade", "Factory Reset", etc.), a wireless connectivity icon 80 (e.g. to indicate Bluetooth connectivity, Wifi connectivity, and the like), a battery life indicator 85, which indicates the battery life or charge remaining on the battery 62 of the switch device 12, one or more tone icons 94*a*, 94*b* which enable the user to adjust the tone capacity as described above, and a lever position indicator 96 that indicates which position the lever 44 of the multi-position switch device 12 is in. Display icons other than those shown by way of example in FIGS. 1 and 24 may also be used by the app if needed.

Figure 25:
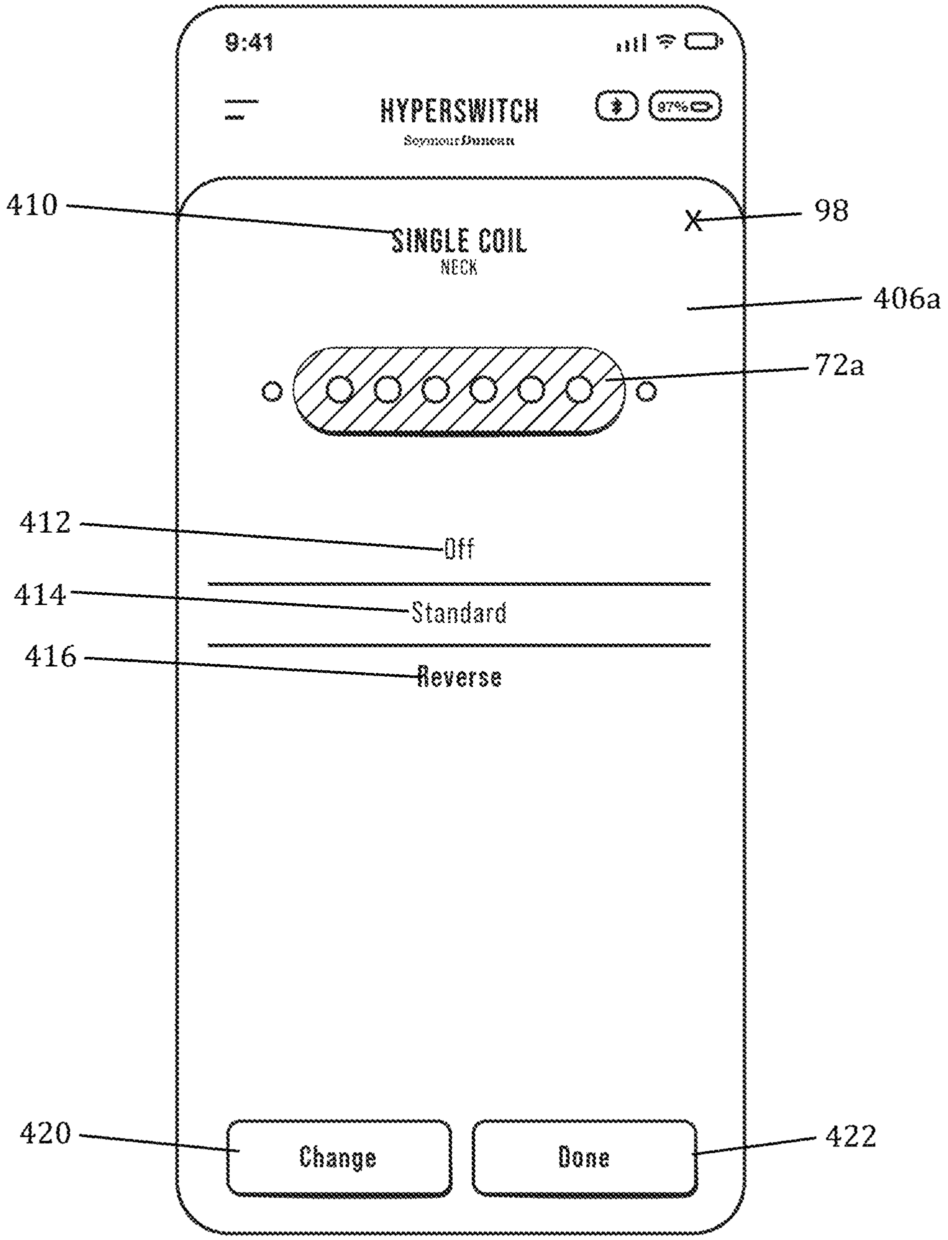
Figure 26:
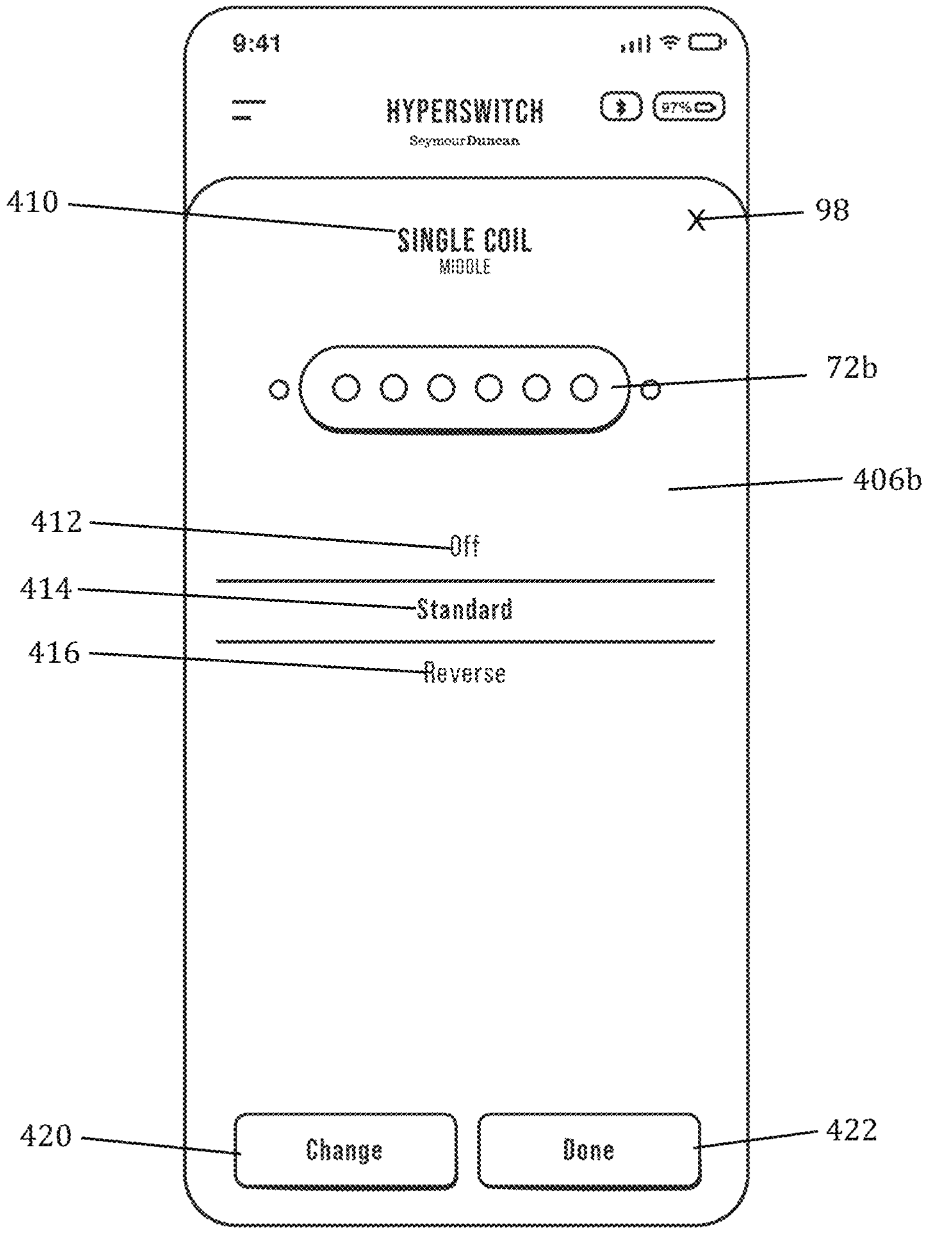
Figure 27:
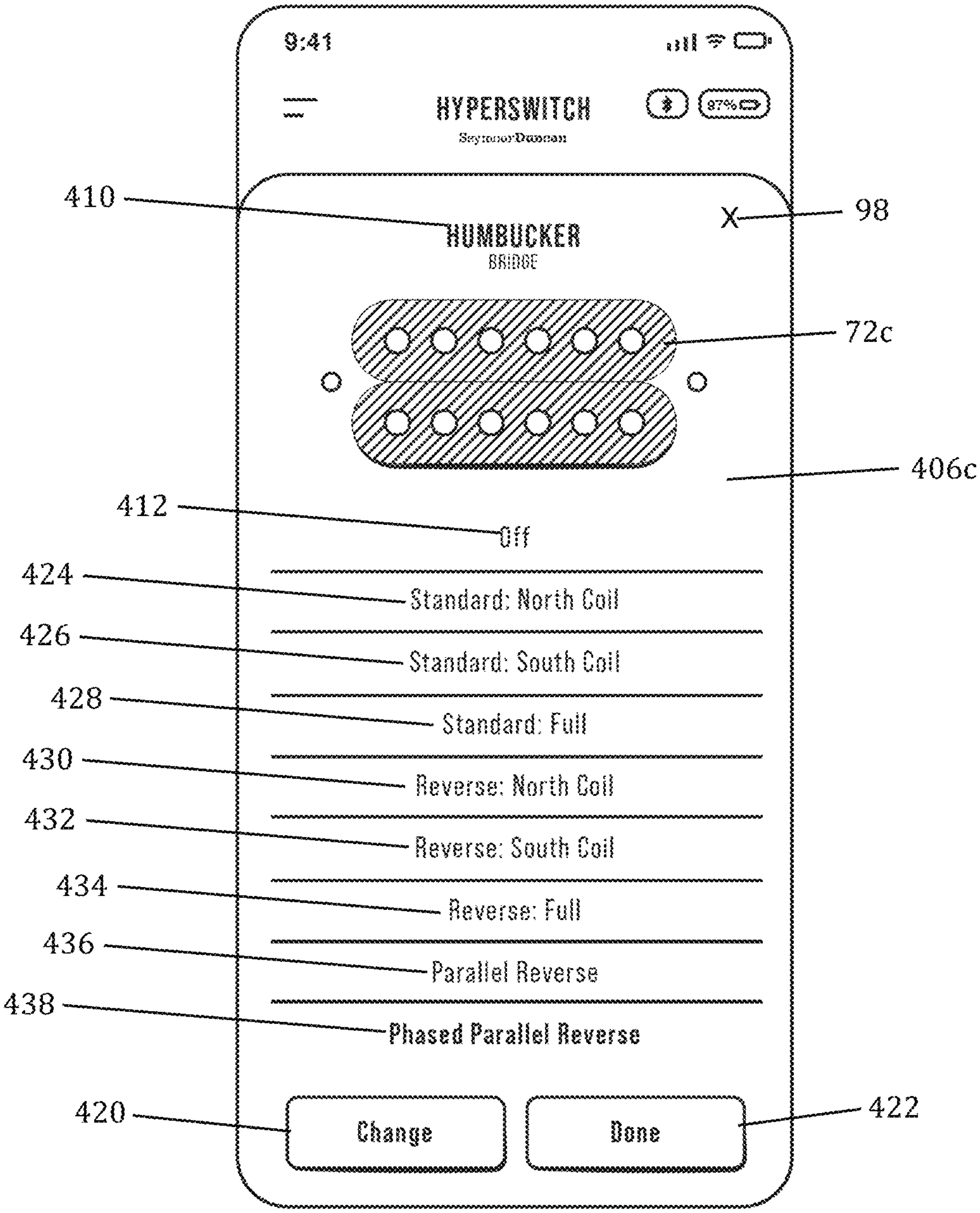

By way of example only, FIGS. 25-27 show example pickup menus 406*a*-406*c* that correspond to the pickup configurations displayed by way of example only on the home screen 404 shown in FIG. 24, in some embodiments. It should be noted that the reference number "406" as used herein may refer to the pickup menus in general, which the reference numbers "406*a*-406*c*" refer to specific iterations of the pickup menu 406 that may be displayed in conjunction with specific pickup icons 72*a*-72*c* on the home screen 404. As will be explained below, the specific pickup menu 406 that is displayed to the user depends upon the type of pickup being adjusted. As will be seen, humbucker pickups may have a different pickup menu associated with them than do single coil pickups.

In some embodiments, a pickup menu 406*a* such as the one shown in FIG. 25 may be presented by the computer 16 to the user upon the user pressing and holding the pickup icon 72*a* of FIG. 24 for a set period of time (e.g., 1-2 seconds). By way of example only, the pickup window 406*a* may be transparent, translucent, or opaque. In some embodiments, the pickup window 406*a* may have a title or menu identifier 410, which may display one or more of the pickup types (e.g., single coil, humbucker, etc) and pickup location (e.g., bridge, mid, neck, etc.). In the instant example, the menu identifier indicates that the pickup being potentially changed is a single coil pickup located on the neck of the instrument. In some embodiments, the pickup menu 406*a* may further include a color-coded pickup icon 72 (or 72*a*, in this instance) which matches the corresponding pickup icon 72*a* displayed on the home screen 404 (e.g. that the user activated to instruct the computer 16 to produce the pickup menu 406*a*). By way of example, the pickup menu 406*a* for a single coil pickup may have at least three selectable configuration options, including but not necessarily limited to "Off" 412, "Standard" 414, and "Reverse" 416. The user may select the desired configuration for the indicated pickup by tapping or clicking on the appropriate menu option. The computer 16 will then cause the selected option to be highlighted (e.g. by a color or brightness halo) to confirm to the user the selected choice. The user may then tap or click on the "Change" button or icon 420, which will cause the computer 16 to change the color-coding of the presented pickup icon 72*a* so that it represents the user's selected choice. If the user is satisfied with the choice, he or she may tap or click on the "Done" button or icon 422, which instructs the computer to close the pickup menu 406*a* and return the user to the home screen 404. The computer 16 will also change the color-coding of the pickup icon 72*a* on the home screen 404 to match the new selection, if necessary. Alternatively, the user may tap or click on the "X" icon 98 in the upper right-hand corner to close the pickup menu 406*a* without effecting any changes to the pickup configuration.

In some embodiments, a pickup menu 406*b* such as the one shown in FIG. 26 may be presented by the computer 16 to the user upon the user pressing and holding the pickup icon 72*b* of FIG. 24 for a set period of time (e.g., 1-2 seconds). By way of example only, the pickup window 406*b* may be transparent, translucent, or opaque. In some embodiments, the pickup window 406*b* may have a title or menu identifier 410, which may display one or more of the pickup types (e.g., single coil, humbucker, etc) and pickup location (e.g., bridge, mid, neck, etc.). In the instant example, the menu identifier indicates that the pickup being potentially changed is a single coil pickup and is located as the middle pickup (e.g., between the bridge and the neck pickups). In some embodiments, the pickup menu 406*b* may further include a color-coded pickup icon 72 (or 72*b*, in this instance) which matches the corresponding pickup icon 72*b* displayed on the home screen 404 (e.g. that the user activated to instruct the computer 16 to produce the pickup menu 406*b*). As described with pickup menu 406*a*, the pickup menu 406*b* for a single coil pickup may have at least three selectable configuration options, including but not necessarily limited to "Off" 412, "Standard" 414, and "Reverse" 416. The user may select the desired configuration for the indicated pickup by tapping or clicking on the appropriate menu option. The computer 16 will then cause the selected option to be highlighted (e.g. by a color or brightness halo) to confirm to the user the selected choice. The user may then tap or click on the "Change" button or icon 420, which will cause the computer 16 to change the color coding of the presented pickup icon 72*b* so that it represents the user's selected choice. If the user is satisfied with the choice, he or she may tap or click on the "Done" button or icon 422, which instructs the computer to close the pickup menu 406*b* and return the user to the home screen 404. The computer 16 will also change the color-coding of the pickup icon 72*b* on the home screen 404 to match the new selection, if necessary. Alternatively, the user may tap or click on the "X" icon 98 in the upper right-hand corner to close the pickup menu 406*b* without effecting any changes to the pickup configuration.

In some embodiments, a pickup menu 406*c* such as the one shown in FIG. 27 may be presented by the computer 16 to the user upon the user pressing and holding the pickup icon 72*c* of FIG. 24 for a set period of time (e.g., 1-2 seconds). By way of example only, the pickup window 406*c* may be transparent, translucent, or opaque. In some embodiments, the pickup window 406*c* may have a title or menu identifier 410, which may display one or more of the pickup types (e.g., single coil, humbucker, etc) and pickup location (e.g., bridge, mid, neck, etc.). In the instant example, the menu identifier indicates that the pickup being potentially changed is a humbucker pickup and is located as the bridge pickup. In some embodiments, the pickup menu 406*c* may further include a color-coded pickup icon 72 (or 72*c*, in this instance) which matches the corresponding pickup icon 72*c* displayed on the home screen 404 (e.g., that the user activated to instruct the computer 16 to produce the pickup menu 406*c*). By way of example, the pickup menu 406*c* for a humbucker pickup may have at least nine selectable configuration options, including but not necessarily limited to "Off" 412, "Standard: North Coil" 424, "Standard: South Coil" 426, "Standard: Full" 428, "Reverse: North Coil" 430, "Reverse: South Coil" 432, "Reverse: Full" 434, "Parallel Reverse" 436, and "Phased Parallel Reverse" 438. The user may select the desired configuration for the indicated pickup by tapping or clicking on the appropriate menu option. The computer 16 will then cause the selected option to be highlighted (e.g. by a color or brightness halo) to confirm to the user the selected choice. The user may then tap or click on the "Change" button or icon 420, which will cause the computer 16 to change the color-coding of the presented pickup icon 72*c* so that it represents the user's selected choice. If the user is satisfied with the choice, he or she may tap or click on the "Done" button or icon 422, which instructs the computer to close the pickup menu 406*c* and return the user to the home screen 404. The computer 16 will also change the color-coding of the pickup icon 72*c* on the home screen 404 to match the new selection, if necessary. Alternatively, the user may tap or click on the "X" icon 98 in the upper right-hand corner to close the pickup menu 406*c* without effecting any changes to the pickup configuration.

By way of example only, FIG. 28 shows an example popup menu screen 408 that the computer 16 presents to the user upon selection of the menu icon 78 on the home screen 404. By way of example only, menu selections may be arranged by type and include "Connect" 440, "Disconnect" 442, "Device Settings" 444, "Application Settings" 446, "My Account" 448, "Tutorials" 450, "Load a Preset" 452, "Save My Preset" 454, "Device Info" 456, "Firmware Upgrade" 458, and "Factory Reset" 460. In some embodiments, tapping or clicking on the "Connect" option 440 instructs the computer 16 to establish or reestablish a wireless data communication between the computing device 16 and the mounted switch device 12, for example if the wireless data communication between the computing device 16 and the mounted switch device 12 became severed for some reason. The menu screen 408 may also include an "X" icon 98 in the upper right hand corner to close the menu screen 408 without effecting any changes. In some embodiments, tapping or clicking on the "Disconnect" option 442 instructs the computer 16 terminate the wireless data communication between the computing device 16 and the switch device 12, for example to conserve power when the user is finished reconfiguring their pickups.

In some embodiments, clicking or tapping on the "Device Settings" option 444 causes the computer 16 to present the user with a variety of options to configure the switch device 12. In some embodiments, clicking or tapping on the "Application Settings" option 446 causes the computer 16 to present the user with a variety of options to configure the app 18, including but not limited to updating or resetting the user's password, instructing the processor 24 to check for available updates to the app 18, toggling notifications on or off, toggling sleep mode on or off, and troubleshooting options. In some embodiments, tapping or clicking on the "My Account" option 448 causes the computer 16 to present the user with a variety of options to change information associated with the user's account including but not limited to (and by way of example only) the user's name, nickname, photo, email address, social media IDs, and the like. In some embodiments, tapping or clicking on the "Tutorials" option 450 causes the computer 16 to present the user with a variety of tutorial options that the user can explore to become familiar with using the app 18 and/or switch device 12.

In some embodiments, tapping or clicking on the "Load A Preset" option 452 causes the computer 16 to present the user with a list of the user's previously saved preset pickup configurations. The user may then tap or click on one of these presets to load into the home screen 404 for a particular lever position. In some embodiments, tapping or clicking on the "Save My Preset" option 454 may save a pickup configuration to the list of presets, much like tapping or clicking on the "Save Preset" button 92 of the home screen 404.

In some embodiments, tapping or clicking on the "Device Info" option 456 causes the computer 16 to present the user with information concerning the connected switch device 12, as well as any other devices that have been saved within the app 18. In some embodiments, tapping or clicking on the "Firmware Upgrade" option 458 causes the computer 16 to check for available firmware upgrades, and to initiate the upgrade process if found. In some embodiments, the "Factory Reset" option 460 causes the computer 16 to reset the app 18 and/or the firmware stored on the switch device 12 to the original configurations as received from the factory. This allows the users to experiment with various sound configurations without having to worry about permanently "ruining" their instrument or product. The "Factory Reset" options 460 provides an option of simply starting over.

In some embodiments, the switching system 10 of the present disclosure may use a proprietary serial communication protocol with a dynamic byte length and a closed loop check to ensure data consistency.

In some embodiments, the switching system 10 of the present disclosure implements a true analog signal path without bypass capacitor or bias resistor in the signal path to ensure a wide frequency response and preserve the signal phase. This removes even unwanted capacitive loads.

In some embodiments, the switching system of the present disclosure may capture, record, and/or otherwise use lever position information (e.g. for electric guitars) information of other sensors that may be present on the instrument or the switching system itself (e.g., potentiometers, accelerometers, position sensors, buttons, etc.), and/or the analog sound streams that may be present on the instrument, and transmit the captured, recorded, or otherwise used data to the user's computing device or other computing systems, for example to control other peripheral wireless-enabled devices using a MIDI protocol or any other serial protocol.

Figure 29:
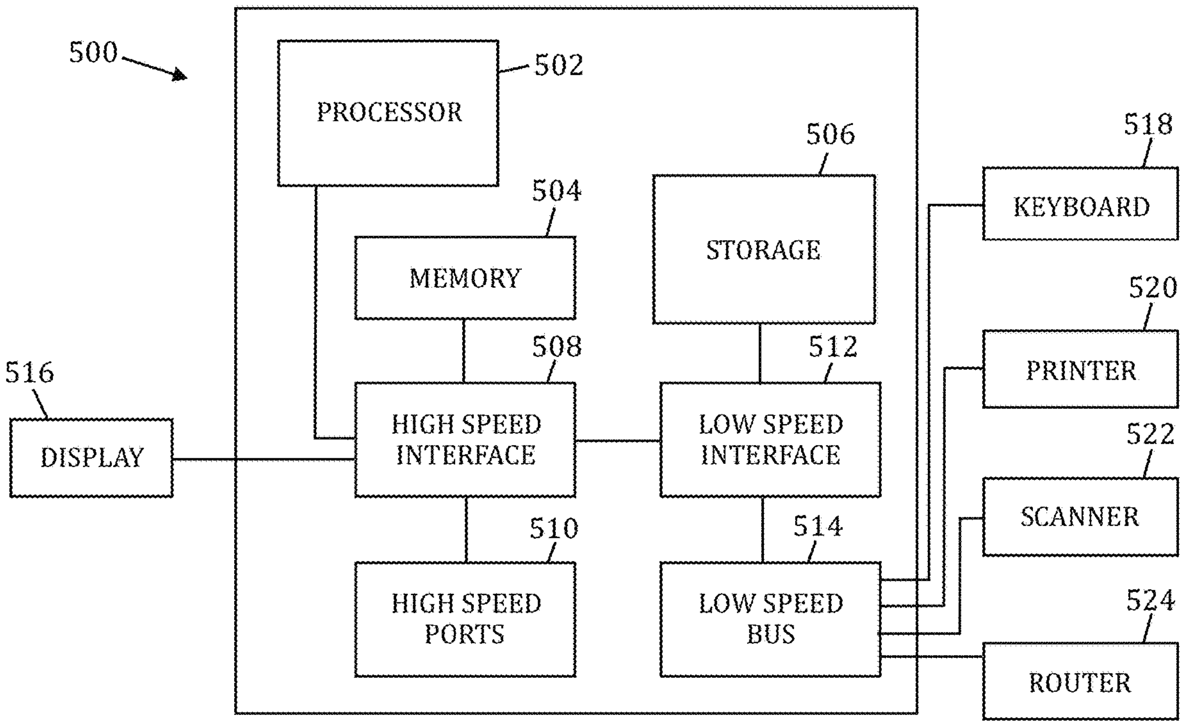
FIGS. 29 and 30 are block diagrams illustrating example computer systems with which any of the devices or systems described herein may be implemented, according to some embodiments.
Figure 30:
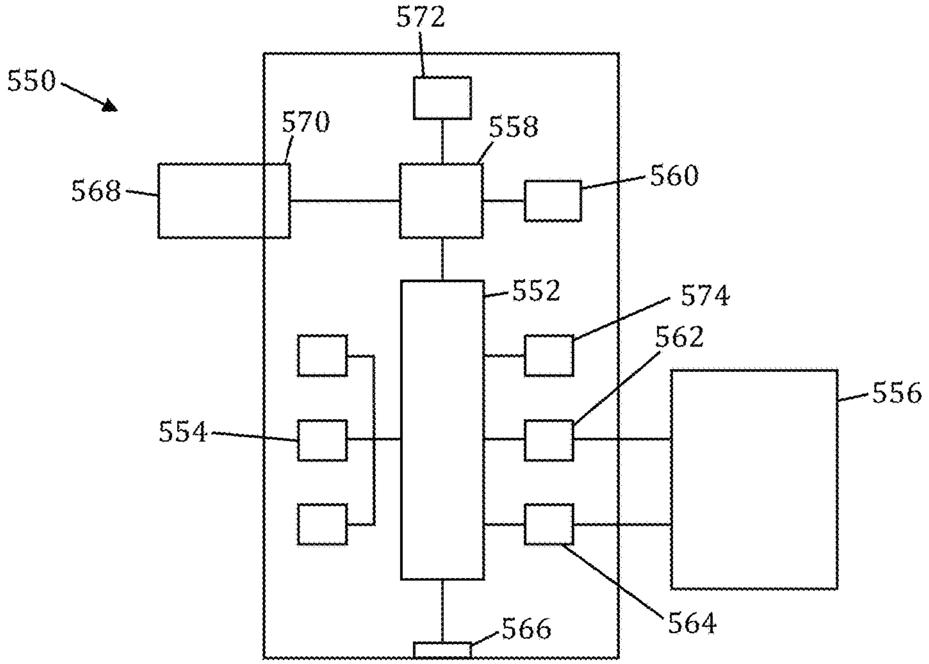

FIGS. 29-30 are example block diagrams of computer-implemented electronic devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. In this example, computing device 550 may represent hand-held computing device 16, while computing device 500 may represent stationary computer 16 and/or computing systems that serve as the cloud 20 referenced in this disclosure. The components shown here, their connections and relationships, and their functions, are meant to be examples only, and are not meant to limit implementations described and/or claimed in this document.

Referring to FIG. 29, computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphic user interface (GUI) on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. By way of example only, the memory 504 may be a volatile memory unit, non-volatile memory unit, or another form of computer-readable medium, such as a magnetic or optical disk (for example).

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed interface 508 manages bandwidth-intensive operations for the computing device 500, while the low speed interface 512 manages lower bandwidth-intensive operations. Such allocation of functions is by way of example only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port may include various communication ports (e.g., USB, Bluetooth, Ethernet, wireless Ethernet) and may be coupled to one or more input/output devices, such as a keyboard 518, a printer 520, a scanner 522, or a networking device such as a switch or router 524, e.g., through a network adapter.

The computing device 500 may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device 500 may be combined with other components in a mobile device, such as device 550 (FIG. 30). Each of such devices may contain one or more of computing device 500, 550, and an entire system may be made up of multiple computing devices 500, 550 communicating with each other.

Referring to FIG. 30, computing device 550 includes a processor 552, memory 554, an input/output device such as a display 556, a communication interface 558, and a transceiver 560, among other components. The device 550 may also be provided with a storage device, such as a microdrive or other device, to provide additional storage. Each of the components 550, 552, 554, 556, 558, and 560, are interconnected using various buses, and several of the components may be mounted on a common motherboard or in other manners as appropriate.

The processor 552 can execute instructions within the computing device 550, including instructions stored in the memory 554. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

The processor 552 may communicate with a user through control interface 562 and display interface 564 coupled to a display 556. The display 556 may be, for example, a TFT (Thin-Film-Transistor Liquid Crystal Display) display or an OLED (Organic Light Emitting Diode) display, or other appropriate display technology. The display interface 564 may comprise appropriate circuitry for driving the display 556 to present graphical and other information to a user. The control interface 562 may receive commands from a user and convert them for submission to the processor 552. In addition, an external interface 566 may be provided in communication with processor 552, so as to enable near area communication of device 550 with other devices. External interface 566 may provide, for example, for wired communication in some implementations, or for wireless communication in other implementations, and multiple interfaces may also be used.

The memory 554 stores information within the computing device 550. The memory 554 can be implemented as one or more of a computer-readable medium or media, a volatile memory unit or units, or a non-volatile memory unit or units. Expansion memory 568 may also be provided and connected to device 550 through expansion interface 570, which may include, for example, a SIMM (Single In Line Memory Module) card interface. Such expansion memory 568 may provide extra storage space for device 550, or may also store applications or other information for device 550. Specifically, expansion memory 568 may include instructions to carry out or supplement the processes described above and may include secure information also. Thus, for example, expansion memory 568 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, cause performance of one or more methods, such as those described above. The information carrier is a computer- or machine-readable medium, such as the memory 554, expansion memory 568, or memory on processor 552 that may be received, for example, over transceiver 560 or external interface 566.

Device 550 may communicate wirelessly through communication interface 558, which may include digital signal processing circuitry where necessary. Communication interface 558 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 560. In addition, short-range communication may occur, such as using a Bluetooth, WiFi, or other such transceiver (not shown). In addition, GPS (Global Positioning System) receiver module 572 may provide additional navigation- and location-related wireless data to device 550, which may be used as appropriate by applications running on device 550.

Device 550 may also communicate audibly using audio codec 574, which may receive spoken information from a user and convert it to usable digital information. Audio codec 574 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, some of which are shown in the figure. For example, it may be implemented as a cellular telephone. It may also be implemented as part of a smartphone, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network.

Any of the features or attributes of the above described embodiments and variations can be used in combination with any of the other features and attributes of the above described embodiments and variations as desired.

From the foregoing disclosure and detailed description of certain preferred embodiments, it is also apparent that various modifications, additions, and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The relationship of client and server arises by virtue of computer programs running on the respective computers and having a client-server relationship to each other.

What is claimed is:

1. A wireless switching system for stringed musical instruments having at least one pickup, comprising:

a multi-position switch device having:

a selector movable between a plurality of selectable positions, each position establishing a portion of a signal pathway from at least one pickup input to an output, the selector operable by a user to effect a change in the electrical signal pathway between the at least one pickup input and the output;

a multiplexer configured to provide multiple configurable signal pathways between the at least one pickup input and the output;

a control unit having a processor in data communication with a memory unit and a wireless communications unit, the control unit configured to determine the active signal pathway through the multiplexer; and computer-readable media embodied in a nontransitory storage medium comprising instructions that, when executed by one or more processors, cause a computer system to:

receive pickup configuration data that is related to the wiring configuration that determines sound output of at least one pickup mounted on the user's stringed musical instrument, and that is input by a user, the pickup configuration data comprising:

(i) pickup location on the user's stringed instrument for a given selector position selected by the user; and (ii) wiring configuration for a given pickup at a given selector position selected by the user;

provide, on a display device, an interactive presentation of the pickup location and selected wiring configurations for each pickup at each selector position; and wirelessly communicate the user-selected wiring configurations for each selector position of the multi-position switch device to the control unit of the multi-position switch device so that the control unit effects a change of the active signal pathway through the multiplexer to implement the user-selected wiring configurations;

wherein the interactive presentation includes a set of selectable color-coded display icons presented on a touch screen user interface of the display device, each of the selectable color-coded display icons representing a single coil of a pickup in a pickup location and configured to visually communicate to the user a phase setting of the represented coil in the selected wiring configuration, and wherein each display icon in the set of selectable color-coded display icons is configured to respond to a touch interaction with a user's finger such that a single tap of one display icon in the set of selectable color-coded display icons causes a change in the pickup configuration on the user's stringed musical instrument.

2. The wireless switching system of claim 1, wherein the multi-position switch device has five selector positions.

3. The wireless switching system of claim 1, wherein the pickup location comprises at least one of bridge, middle, and neck.

4. The wireless switching system of claim 1, wherein the instructions further cause the computer system to:

save a user's selected pickup wiring configuration as a preset pickup configuration that is selectable by the user at a later time.

5. The wireless switching system of claim 1, wherein the instructions further cause the computer system to:

save a set of pickup wiring configurations as a single recallable preset configuration that is selectable by the user at a later time, the set comprising the user's selected pickup wiring configuration for each selector position of the multi-position switch device.

6. The wireless switching system of claim 5, wherein the instructions further cause the computer system to:

save a plurality of sets of pickup wiring configurations as unique recallable preset configurations that are selectable by the user at a later time, each set comprising a unique combination of the user's selected pickup wiring configurations for each selector position of the multi-position switch device.

7. The wireless switching system of claim 1, wherein the selector comprises at least one of a lever, toggle, slide, and rotor.

8. The wireless switching system of claim 1, wherein the selector is at least one of mechanically and electrically operated.

9. The wireless switching system of claim 1, wherein the wiring configuration data comprises inter-coil wiring configuration data.

10. The wireless switching system of claim 1, wherein the at least one pickup comprises a single coil pickup.

11. The wireless switching system of claim 10, wherein the pickup configuration data comprises at least one of standard, reverse, and off.

12. The wireless switching system of claim 1, wherein the at least one pickup comprises a multiple coil pickup.

13. The wireless switching system of claim 12, wherein the pickup configuration data comprises at least one of standard north coil, standard south coil, standard full, reverse north coil, reverse south coil, reverse full, parallel reverse, and phased parallel reverse.

14. The wireless switching system of claim 1, wherein the wiring configuration comprises at least one of clockwise, counter-clockwise, top coming, and top going.

15. The wireless switching system of claim 1, wherein the display device comprises a portable electronic device.

16. A method for wirelessly configuring a multi-position switch system for stringed musical instruments, comprising:

providing a multi-position switch device configured for installation on a stringed musical instrument having a plurality of pickups mounted thereupon, the multi-position switch device having:

a selector movable between a plurality of positions, each position establishing a portion of a signal pathway from pickup inputs to an output, the selector operable by a user to effect a change in the electrical signal pathway between the pickup inputs and the output;

a multiplexer configured to provide multiple configurable signal pathways between the pickup inputs and the output;

a control unit having a processor in data communication with a memory unit and a wireless communications unit, the control unit configured to determine the active signal pathway through the multiplexer;

inputting pickup configuration data related to the wiring configuration that determines sound output of the pickups mounted on the stringed musical instrument into a computer system, the pickup configuration data comprising:

selector position data that indicates the current position of the multi-position switch system in which the selector is positioned;

pickup location data that indicates the location of each pickup mounted on the stringed musical instrument for the indicated selector position; and wiring configuration data for each pickup mounted on the stringed musical instrument at the indicated selector position;

interacting, with a computer system providing, on a display device, an interactive presentation of the pickup locations and wiring configurations for each pickup for the indicated selector position, to:

select a pickup at a particular location for the indicated selector position, and change the wiring configuration for the selected pickup for the indicated selector position; and wirelessly communicating the selected wiring configurations for the indicated selector position of the multi-position switch device to the control unit of the multi-position switch device so that the control unit effects a change of the active signal pathway through the multiplexer to implement the selected wiring configuration;

wherein the interactive presentation includes a set of selectable color-coded display icons presented on a touch screen user interface of the display device, each of the selectable color-coded display icons representing a single coil of a pickup in a pickup location and configured to visually communicate to the user a phase setting of the represented coil in the selected wiring configuration, and wherein each display icon in the set of selectable color-coded display icons is configured to respond to a touch interaction with a user's finger such that a single tap of one display icon in the set of selectable color-coded display icons causes a change in the pickup configuration on the user's stringed musical instrument.

17. The method of claim 16, further comprising the step of:

saving a selected pickup wiring configuration as a preset pickup configuration that is selectable at a later time.

18. The method of claim 16, further comprising the step of:

saving a set of pickup wiring configurations as a single recallable preset configuration that is selectable at a later time, the set comprising the selected pickup wiring configuration for each selector position of the multi-position switch device.

19. The method of claim 16, further comprising the step of:

saving a plurality of sets of pickup wiring configurations as unique recallable preset configurations that are selectable at a later time, each set comprising a unique combination of selected pickup wiring configurations for each selector position of the multi-position switch device.

20. A computer program product embodied in a non-transitory computer readable storage medium and comprising computer instructions for:

establishing a wireless data connection between a user's computing device and a multi-position switch device mounted on a stringed instrument, the multi-position switch device having a control unit comprising a processor, a memory unit, and a wireless communications unit;

receiving pickup configuration data that is input by the user and related to the wiring configuration that determines sound output of pickups mounted on the user's stringed musical instrument, the pickup configuration data comprising:

pickup location on the user's stringed instrument for a given selector position selected by the user; and wiring configuration for a given pickup at a given selector position selected by the user;

providing, on a display device, an interactive presentation of the pickup locations and selected wiring configurations for each pickup for each selector position; and wirelessly communicating the user-selected pickup configuration data for each selector position of the multi-position switch device to the control unit of the multi-position switch device so that the control unit effects one or more signal pathways through the multi-position switch device to implement the user-selected wiring configurations;

wherein the interactive presentation includes a set of selectable color-coded display icons presented on a touch screen user interface of the display device, each of the selectable color-coded display icons representing a single coil of a pickup in a pickup location and configured to visually communicate to the user a phase setting of the represented coil in the selected wiring configuration, and wherein each display icon in the set of selectable color-coded display icons is configured to respond to a touch interaction with a user's finger such that a single tap of one display icon in the set of selectable color-coded display icons causes a change in the pickup configuration on the user's stringed instrument.

* * * * *